United States Patent
Mahar et al.

(10) Patent No.: US 12,449,366 B2
(45) Date of Patent: Oct. 21, 2025

(54) SURFACE-ENHANCED RAMAN SPECTROSCOPIC METHOD OF DETECTING AN ANTI-CANCER DRUG IN A SOLUTION

(71) Applicant: KING FAHD UNIVERSITY OF PETROLEUM AND MINERALS, Dhahran (SA)

(72) Inventors: Nasurullah Mahar, Dhahran (SA); Amir Al-Ahmed, Dhahran (SA); Abdulaziz Abdulrahman Al-Saadi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 511 days.

(21) Appl. No.: 18/164,163

(22) Filed: Feb. 3, 2023

(65) Prior Publication Data
US 2024/0272078 A1    Aug. 15, 2024

(51) Int. Cl.
*G01N 21/65* (2006.01)
*G01N 33/49* (2006.01)

(52) U.S. Cl.
CPC .......... *G01N 21/658* (2013.01); *G01N 33/49* (2013.01)

(58) Field of Classification Search
CPC ...... G01N 21/65; G01N 21/658; G01N 33/49; G01N 33/20; Y10T 436/14; Y10T 436/141111; Y10T 436/145555; Y10T 436/147777; Y10T 436/17; Y10T 436/173845; Y10T 436/19; Y10T 436/196666; Y10T 436/20; Y10T 436/203332
USPC ...... 436/73, 80, 83, 91, 92, 93, 96, 98, 106, 436/111, 124, 126, 127, 131, 164, 171
See application file for complete search history.

(56) References Cited

U.S. PATENT DOCUMENTS

2022/0219993 A1    7/2022    Ciou et al.
2022/0233727 A1 *  7/2022    Thakor .................. A61B 6/481

FOREIGN PATENT DOCUMENTS

| CN | 112938979 | A | * | 6/2021 |
| CN | 113624735 | A | * | 11/2021 |
| CN | 114166825 | A |   | 3/2022 |
| CN | 115105592 | A |   | 9/2022 |
| WO | 2020/082491 | A1 |   | 4/2020 |

OTHER PUBLICATIONS

Mahar et al. Applied Surface Science, vol. 607, 155034, pp. 1-10, Sep. 27, 2022.*
Mahar et al. Arabian Journal for Science and Engineering, vol. 47, pp. 7197-7205, May 21, 2022.*
Mahar et al. Computational and Theoretical Chemistry, vol. 1217, 113914, pp. 1-17, Oct. 17, 2022.*
Haider et al. Applied Nanomaterials, vol. 6, pp. 2374-2384, Feb. 2, 2023.*
Haroon et al. Journal of Molecular Liquids, vol. 312, 113402, pp. 1-8, May 21, 2020.*
Chen et al. Analytical and Bioanalytical Chemistry, vol. 415, pp. 5379-5389, Jul. 1, 2023.*
Hu, et al. ; Vanadium-based nanomaterials for cancer diagnosisand treatment ; Biomedical Materials, vol. 16, No. 1 ; Dec. 23, 2020 ; 4 Pages ; Abstract Only.
Thakur, et al. ; Insights into the Thermal and Chemical Stability of Multilayered V2CTx MXene Under Different Environments ; Nanoscale, 2019 ; 24 Pages.
Lan, et al. ; Flexible Two-Dimensional Vanadium Carbide MXene-Based Membranes with Ultra-Rapid Molecular Enrichment for Surface-Enhanced Raman Scattering ; ACS Appl. Mater. Interfaces 14 ; 2022 ; 10 Pages.
Lan, et al. ; Supporting Information Flexible Two-Dimensional Vanadium Carbide MXene-Based Membranes with Ultra-Rapid Molecular Enrichment for Surface-Enhanced Raman Scattering ; ACS Appl. Mater. Interfaces 14 ; 2022 ; 11 Pages.

* cited by examiner

*Primary Examiner* — Maureen Wallenhorst
(74) *Attorney, Agent, or Firm* — Oblon, McClelland, Maier & Neustadt, L.L.P.

(57) ABSTRACT

A method of detecting an anti-cancer drug in a solution including contacting a substrate with the solution and measuring a Raman signal of the anti-cancer drug in the solution. The substrate includes a layer of a nanomaterial that is at least partially coated on an outer surface of the substrate. The nanomaterial includes silver nanoparticles and a $V_2CT_x$ MXene, where $T_x$ is at least one selected from the group consisting of hydroxide (—OH), oxygen (—O), and fluorine (—F). The anti-cancer drug interacts with the nanomaterial on the outer surface of the substrate in the solution.

20 Claims, 25 Drawing Sheets

SURFACE-ENHANCED RAMAN SPECTROSCOPIC METHOD OF DETECTING AN ANTI-CANCER DRUG IN A SOLUTION

STATEMENT OF PRIOR DISCLOSURE BY INVENTOR

Aspects of the present disclosure are described in N. Mahar, A. Al-Ahmed, A. and A. Al-Saadi, "Synthesis of vanadium carbide MXene with improved inter-layer spacing for SERS-based quantification of anti-cancer drugs"; Applied Surface Science; Sep. 27, 2022; 607, 155034, incorporated herein by reference in its entirety.

STATEMENT OF ACKNOWLEDGEMENT

Support provided by King Fahd University of Petroleum and Minerals (KFUPM), Grant DF191043, is gratefully acknowledged.

BACKGROUND

Technical Field

The present disclosure is directed to a method of detecting an anti-cancer drug in a solution based on a Raman signal.

Description of Related Art

The "background" description provided herein is to generally present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Detection of medications, such as anti-cancer drugs, allows for improved monitoring and clinical assessment of patients in need. Gemcitabine (GMC), formula (1) below, is a medication that is commonly used for the diagnosis of different types of cancer. As an anti-cancer prodrug, it is activated by intracellular phosphorylation generating di- and tri-phosphate-based derivatives that inhibit deoxyribonucleic acid (DNA) synthesis and ribonucleotide reductase activity, resulting in the death of tumor cells. Therefore, detection of GMC at low concentrations is needed to quickly monitor the drug in the human body.

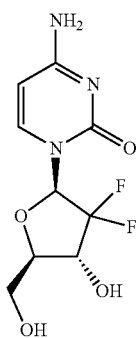

(1)

New types of two-dimensional (2D) nanomaterials and their role as effective substrates for Surface-Enhanced Raman Scattering (SERS) based monitoring of organic traces, such as anti-cancer drugs, has attracted attention. The SERS-based sensing approach has been shown to be non-destructive, and an optically driven tool exhibiting a fast response time, high sensitivity, reproducibility, and convenient sample handling. The most common 2D material is graphene, due to its surface plasmonic resonance (SPR), along with its excellent mechanical and electrical properties. However, the SPR response by graphene was found to be limited to the infrared and terahertz (THz) regions, thus restricting the electromagnetically modified enhancement within the visible region. This is often overcome through chemical treatments by in-situ and ex-situ hybridization processes.

Recently, MXene has been introduced as a promising 2D nanomaterial for SERS applications. MXenes are ceramics prepared from bulk crystals known as a MAX, generally represented as $M_{n+1}AX_n$, where M is an early transition metal, A is aluminum or gallium, and X is carbon (C), nitrogen (N) or boron (B) atoms. MXenes are prepared by removing "A" from the MAX through various techniques leading to $M_{n+1}X_nT_x$, where "T" is the heterogeneous terminal e.g., hydroxide (OH), fluorine (F) or oxygen (O)) with as many as 'x' number. MXene's advantage over graphene is based on its fluorescence quenching ability, biocompatibility, and long-range spectral stability. Due to their flatness and large surface area, they exhibit better photo-induced charge transfer (CT) resonance, an excellent plasmonic resonance effect, and strong interaction of surface atoms with adsorbate molecules. Furthermore, the tunability of the chemical and physical properties of the MXene renders it a promising candidate for hybridization using nanoparticles, thus enabling the MXene to further enhance the electronic and optical competitive edge.

MXenes, such as titanium carbide ($Ti_3C_2$), titanium nitride ($Ti_2N$), niobium carbide ($Nb_2C$), and tantalum carbide ($Ta_2C$), have been reported for possible SERS detection. Yet, the stability of metals in their respective oxides has prevented advances in their application. Therefore, there still exists an unmet need for an MXene that can detect anti-cancer drugs rapidly and efficiently by SERS. Accordingly, an object of the present disclosure is to provide a nanomaterial of an MXene and nanoparticles that can detect anti-cancer drugs by SERS. It is another object of the present disclosure is to provide a nanomaterial that can detect anti-cancer drugs at low concentrations by SERS.

SUMMARY

In an exemplary embodiment, a method of detecting an anti-cancer drug in a solution is described. The method includes contacting a substrate with the solution and further measuring the Raman signal of the anti-cancer drug in the solution. A layer of a nanomaterial is at least partially coated on an outer surface of the substrate. The anti-cancer drug interacts with the nanomaterial on the outer surface of the substrate in the solution. The nanomaterial includes silver nanoparticles and a $V_2CT_x$ MXene, where $T_x$ is at least one selected from the group consisting of hydroxide (—OH), oxygen (—O), and fluorine (—F).

In some embodiments, the $V_2CT_x$ MXene includes 40-60 weight percentage (wt. %) Vanadium (V), 10-30 wt. % Carbon (C), 5-25 wt. % O, and 0.1-2 wt. % F, and the $V_2CT_x$ MXene does not include aluminum (Al).

In some embodiments, the $V_2CT_x$ MXene is in the form of delaminated layered flakes.

In some embodiments, a spacing between layers of the flakes is 6-10 angstroms (Å).

In some embodiments, the flakes have a longest dimension of 1-20 micrometers (μm).

In some embodiments, the flakes have a thickness of 1-10 nanometers (nm).

In some embodiments, an intercalant with a hydrated radii of 1-6 Å is intercalated between the layered flakes.

In some embodiments, the intercalant is triethylamine (TEA).

In some embodiments, the silver (Ag) nanoparticles have an average diameter of 5-60 nm.

In some embodiments, the silver nanoparticles have a bimodal size distribution with a first set having an average diameter of 1-5 nm and a second set having an average diameter of 20-30 nm.

In some embodiments, the first set of silver nanoparticles are aggregated on the outer surface of the substrate, and the aggregates have an average size of 10-30 nm.

In some embodiments, an outer surface of the silver nanoparticles has carboxylic acid groups.

In some embodiments, the silver nanoparticles are distributed on an outer surface of the $V_2CT_x$ MXene.

In some embodiments, the method further includes quantifying the amount of the anti-cancer drug in the solution based on the intensity of a Raman signal.

In some embodiments, an intensity of the Raman signal linearly correlates with an amount of the anti-cancer drug in the solution.

In some embodiments, an intensity of the Raman signal is $10^5$ to $10^9$ greater than a same solution but without contacting the substrate.

In some embodiments, the silver nanoparticles interact with the anti-cancer drug and the $V_2CT_x$ MXene via charge transfer interactions.

In some embodiments, a limit of detection of the anti-cancer drug in the solution is up to $1 \times 10^{-12}$ Molarity (M).

In some embodiments, the anti-cancer drug is gemcitabine (GMC).

In some embodiments, the solution is human blood.

The foregoing general description of the illustrative present disclosure and the following The detailed description thereof are merely exemplary aspects of the teachings of this disclosure and are not restrictive.

BRIEF DESCRIPTION OF THE DRAWINGS

A complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
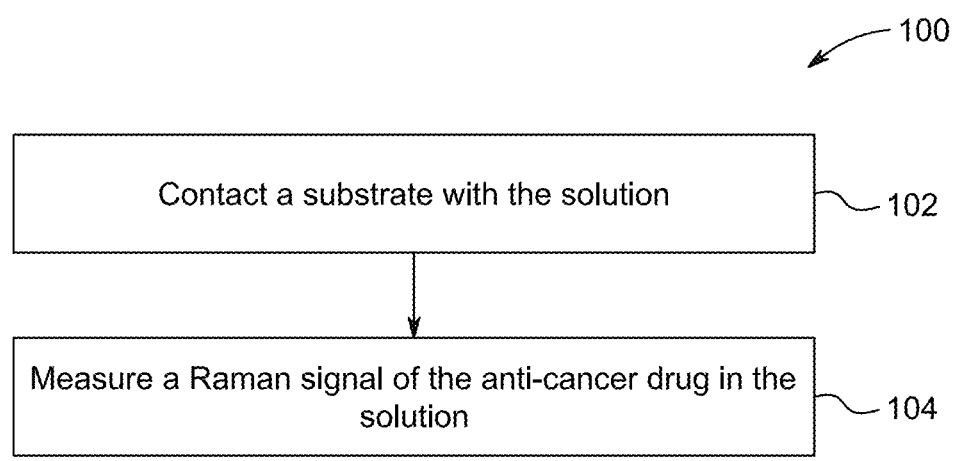
FIG. 1 is a schematic flow diagram of a method of detecting an anti-cancer drug in a solution, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

All ranges disclosed herein are inclusive of the endpoints, and the endpoints are independently combinable with each other, and inclusive of all intermediate values of the ranges. Thus, ranges articulated within this disclosure, e.g., numerics/values, shall include the individual points within the range, sub-ranges, and combinations thereof.

As used herein, the term "cancer" refers to a disease in which some of the body's cells grow uncontrollably and spread to other parts of the body.

As used herein, the term "drug" refers to any chemical substance that causes a change in an organism's physiology or psychology when consumed.

As used herein, the term "solution" refers to a homogeneous mixture composed of two or more substances.

As used herein, the term "solvent" refers to a liquid that can dissolve another substance.

As used herein, the term "nanomaterial" refers to materials with at least one dimension of 1,000 nm or less.

As used herein, the term "delamination" refers to when a material fractures into layers.

As used herein, the term "flakes" refers to a small, flat, very thin piece of a material, typically one which has broken away or been peeled off from a larger piece.

As used herein, the term "intercalant" refers to inserting between or among existing elements or layers.

Embodiments of the present disclosure are directed to a method of detecting an anti-cancer drug in a solution by Surface-Enhanced Raman Scattering (SERS). For this purpose, a vanadium-based MXene of the formula $V_2CT_x$ was prepared, exfoliated, and modified with silver nanoparticles (AgNPs). The synthesized AgNPs@$V_2CT_x$ was loaded on a substrate and used as a SERS substrate for the trace detection of an anticancer drug, namely gemcitabine (GMC).

Referring to FIG. 1, a schematic flow diagram of the method of detecting an anti-cancer drug in a solution is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes contacting a substrate with the solution. In some embodiments, the substrate is at least partially submerged in the solution. In some embodiments, the solution is any solution which may contain an anticancer drug, including but not limited to blood, urine, saliva, mucus, bile of a patient that has received the anti-cancer drug. The patient may be a human or any mammal. In some embodiments, the solution is human blood. In some embodiments, the solution is wastewater that may include waste of a patient that received the anti-cancer drug. In some embodiments, the solution further includes molecules or ions other than the anti-cancer drug, including procainamide (PA), ciprofloxacin (CPN), amphetamine (AA), valeric acid (VA), alkali metal ions, alkaline earth metal ions, and hydroxides.

In some embodiments, the term "cancer" refers to all types of cancer, neoplasm, or malignant tumors found in mammals (e.g., humans), including leukemia, lymphoma, carcinomas, and sarcomas. Exemplary cancers that may be treated with a compound or method provided herein include cancer of the thyroid, endocrine system, brain, breast, cervix, colon, head and neck, liver, kidney, lung, non-small cell lung, melanoma, mesothelioma, ovary, sarcoma, stomach, uterus medulloblastoma, colorectal cancer, or pancreatic cancer. Additional examples include Hodgkin's Disease, Non-Hodgkin's Lymphoma, multiple myeloma, neuroblastoma, glioma, glioblastoma multiforme, ovarian cancer, rhabdomyosarcoma, primary thrombocytosis, primary macroglobulinemia, primary brain tumors, malignant pancreatic insulinoma, malignant carcinoid, urinary bladder cancer, premalignant skin lesions, testicular cancer, lymphomas, thyroid cancer, esophageal cancer, genitourinary tract cancer, malignant hypercalcemia, endometrial cancer, adrenal cortical cancer, neoplasms of the endocrine or exocrine pancreas, medullary thyroid cancer, medullary thyroid carcinoma, melanoma, colorectal cancer, papillary thyroid cancer, hepatocellular carcinoma, or prostate cancer.

In another embodiment, the anti-cancer drug refers to a composition (e.g., compound, drug, antagonist, inhibitor, modulator) having antineoplastic properties or the ability to inhibit the growth or proliferation of cells. Anti-cancer drugs may be selective for certain cancers or specific tissues. In some embodiments, anti-cancer drugs herein may include epigenetic inhibitors and multi-kinase inhibitors. In some embodiments, an anti-cancer drug is chemotherapeutic. In some embodiments, an anti-cancer drug is deemed useful in treating cancer. In some embodiments, an anti-cancer drug is approved by the Food and Drug Administration (FDA) or a similar regulatory agency of a country other than the United States of America (USA) for treating cancer.

Examples of anti-cancer drugs include, but are not limited to, Ethyl Methyl Ketone (MEK) (e.g. MEK1, MEK2, or MEK1 and MEK2) inhibitors (e.g. XL518, CI-1040, PD035901, selumetinib/AZD6244, GSK1120212/trametinib, GDC-0973, ARRY-162, ARRY-300, AZD8330, PD0325901, U0126, PD98059, TAK-733, PD318088, AS703026, BAY 869766), alkylating drugs (e.g., cyclophosphamide, ifosfamide, chlorambucil, busulfan, melphalan, mechlorethamine, uramustine, thiotepa, nitrosoureas, nitrogen mustards (e.g., mechloroethamine, cyclophosphamide, chlorambucil, meiphalan), ethylenimine and methylmelamines (e.g., hexamethylmelamine, thiotepa), alkyl sulfonates (e.g., busulfan), nitrosoureas (e.g., carmustine, lomusitne, semustine, streptozocin), triazenes (decarbazine)), anti-metabolites (e.g., 5-azathioprine, leucovorin, capecitabine, fludarabine, pemetrexed, raltitrexed, folic acid analog (e.g., methotrexate), or pyrimidine analogs (e.g., fluorouracil, floxouridine, Cytarabine), purine analogs (e.g., mercaptopurine, thioguanine, pentostatin), etc.), plant alkaloids (e.g., vincristine, vinblastine, vinorelbine, vindesine, podophyllotoxin, paclitaxel, docetaxel, etc.), topoisomerase inhibitors (e.g., irinotecan, topotecan, amsacrine, etoposide (VP16), etoposide phosphate, teniposide, etc.), antitumor antibiotics (e.g., doxorubicin, adriamycin, daunorubicin, epirubicin, actinomycin, bleomycin, mitomycin, mitoxantrone, plicamycin, etc.), platinum-based compounds (e.g. cisplatin, oxaloplatin, carboplatin), anthracenedione (e.g., mitoxantrone), substituted urea (e.g., hydroxyurea), methyl hydrazine derivative (e.g., procarbazine), adrenocortical suppressant (e.g., mitotane, aminoglutethimide), epipodophyllotoxins (e.g., etoposide), antibiotics (e.g., daunorubicin, doxorubicin, bleomycin), enzymes (e.g., L-asparaginase), inhibitors of mitogen-activated protein kinase signaling (e.g. U0126, PD98059, PD184352, PD0325901, ARRY-142886, SB239063, SP600125, BAY 43-9006, wortmannin, or LY294002, Syk inhibitors, mTOR inhibitors, antibodies (e.g., rituxan), gossyphol, genasense, polyphenol E, Chlorofusin, all trans-retinoic acid (ATRA), bryostatin, tumor necrosis factor-related apoptosis-inducing ligand (TRATL), 5-aza-2'-deoxycytidine, all trans retinoic acid, doxorubicin, vincristine, etoposide, gemcitabine, imatinib (Gleevec®), geldanamycin, 17-N-Allylamino-17-Demethoxygeldanamycin (17-AAG), flavopiridol, LY294002, bortezomib, trastuzumab, BAY 11-7082, PKC412, PD184352, 20-epi-1,25 dihydroxyvitamin D3; 5-ethynyluracil; abiraterone; aclarubicin; acylfulvene; adecypenol; adozelesin; aldesleukin; ALL-TK antagonists; altretamine; ambamustine; amidox; amifostine; aminolevulinic acid; amrubicin; amsacrine; anagrelide; anastrozole; andrographolide; angiogenesis inhibitors; antagonist D; antagonist G; antarelix; anti-dorsalizing morphogenetic protein-1; antiandrogen, prostatic carcinoma; antiestrogen; antineoplaston; antisense oligonucleotides; aphidicolin glycinate; apoptosis gene modulators; apoptosis regulators; apurinic acid; ara-CDP-DL-PTBA; arginine deaminase; asulacrine; atamestane; atrimustine; axinastatin 1; axinastatin 2; axinastatin 3; azasetron; azatoxin; azatyrosine; baccatin III derivatives; balanol; batimastat; BCR/ABL antagonists; benzochlorins; benzoylstaurosporine; beta lactam derivatives; beta-alethine; betaclamycin B; betulinic acid; bFGF inhibitor; bicalutamide; bisantrene; bisaziridinylspermine; bisnafide; bistratene A; bizelesin; breflate; bropirimine; budotitane; buthionine sulfoximine; calcipotriol; calphostin C; camptothecin derivatives; canarypox IL-2; capecitabine; carboxamide-amino-triazole; carboxyamidotriazole; CaRest M3; CARN 700; cartilage derived inhibitor; carzelesin; casein kinase inhibitors (ICOS); castanospermine; cecropin B; cetrorelix; chlorins; chloroquinoxaline sulfonamide; cicaprost; cis-porphyrin; cladribine; clomifene analogues; clotrimazole; collismycin A; collismycin B; combretastatin A4; combretastatin analogue; conagenin; crambescidin 816; crisnatol; cryptophycin 8; cryptophycin A derivatives; curacin A; cyclopentanthraquinones; cycloplatam; cypemycin; cytarabine ocfosfate; cytolytic factor; cytostatin; dacliximab; decitabine; dehydrodidemnin B; deslorelin; dexamethasone; dexifosfamide; dexrazoxane; dexverapamil; diaziquone; didemnin B; didox; diethylnorspermine; dihydro-5-azacytidine; 9-dioxamycin; diphenyl spiromustine; docosanol; dolasetron; doxifluridine; droloxifene; dronabinol; duocarmycin SA; ebselen; ecomustine; edelfosine; edrecolomab; eflornithine; elemene; emitefur; epirubicin; epristeride; estramustine analogue; estrogen agonists; estrogen antagonists; etanidazole; etoposide phosphate; exemestane; fadrozole; fazarabine; fenretinide; filgrastim; finasteride; flavopiridol; flezelastine; fluasterone; fludarabine; fluorodaunorunicin hydrochloride; forfenimex; formestane; fostriecin; fotemustine; gadolinium texaphyrin; gallium nitrate; galocitabine; ganirelix; gelatinase inhibitors; gemcitabine; glutathione inhibitors; hepsulfam; heregulin; hexamethylene bisacetamide; hypericin; ibandronic acid; idarubicin; idoxifene; idramantone; ilmofosine; ilomastat; imidazoacridones; imiquimod; immunostimulant peptides; insulin-like growth factor-1 receptor inhibitor; interferon agonists; interferons; interleukins; iobenguane; iododoxorubicin; ipomeanol, 4-; iroplact; irsogladine; isobengazole; isohomohalicondrin B; itasetron; jasplakinolide; kahalalide F; lamellarin-N triacetate; lanreotide; leinamycin; lenograstim; lentinan sulfate; leptolstatin; letrozole; leukemia inhibiting factor; leukocyte alpha interferon; leuprolide+estrogen+progesterone; leuprorelin; levamisole; liarozole; linear polyamine analogue; lipophilic disaccharide peptide; lipophilic platinum compounds; lissoclinamide 7; lobaplatin; lombricine; lometrexol; lonidamine; losoxantrone; lovastatin; loxoribine; lurtotecan; lutetium texaphyrin; lysofylline; lytic peptides; maitansine; mannostatin A; marimastat; masoprocol; maspin; matrilysin inhibitors; matrix metalloproteinase inhibitors; menogaril; merbarone; meterelin; methioninase; metoclopramide; MIF inhibitor; mifepristone; miltefosine; mirimostim; mismatched double stranded RNA; mitoguazone; mitolactol; mitomycin analogues; mitonafide; mitotoxin fibroblast growth factor-saporin; mitoxantrone; mofarotene; molgramostim; monoclonal antibody, human chorionic gonadotrophin; monophosphoryl lipid A+myobacterium cell wall sk; mopidamol; multiple drug resistance gene inhibitor; multiple tumor suppressor 1-based therapy; mustard anticancer drug; mycaperoxide B; mycobacterial cell wall extract; myriaporone; N-acetyldinaline; N-substituted benzamides; nafarelin; nagrestip; naloxone+pentazocine; napavin; naphterpin; nartograstim; nedaplatin; nemorubicin; neridronic acid; neutral endopeptidase; nilutamide; nisamycin; nitric oxide modulators; nitroxide antioxidant; nitrullyn; O6-benzylguanine; octreotide; okicenone; oligonucleotides; onapristone; ondansetron; ondansetron; oracin; oral cytokine inducer; ormaplatin; osaterone; oxaliplatin; oxaunomycin; palauamine; palmitoylrhizoxin; pamidronic acid; panaxytriol; panomifene; parabactin; pazelliptine; pegaspargase; peldesine; pentosan polysulfate sodium; pentostatin; pentrozole; perflubron; perfosfamide; perillyl alcohol; phenazinomycin; phenylacetate; phosphatase inhibitors; picibanil; pilocarpine hydrochloride; pirarubicin; piritrexim; placetin A; placetin B; plasminogen activator inhibitor; platinum complex; platinum compounds; platinum-triamine complex; porfimer sodium; porfiromycin; prednisone; propyl bis-acridone; prostaglandin J2; proteasome inhibitors; protein A-based immune modulator; protein kinase C inhibitor; protein kinase C inhibitors, microalgal; protein tyrosine phosphatase inhibitors; purine nucleoside phosphorylase inhibitors; purpurins; pyrazoloacridine; pyridoxylated hemoglobin polyoxyethylerie conjugate; raf antagonists; raltitrexed; ramosetron; ras farnesyl protein transferase inhibitors; ras inhibitors; ras-GAP inhibitor; retelliptine demethylated; rhenium Re 186 etidronate; rhizoxin; ribozymes; RII retinamide; rogletimide; rohitukine; romurtide; roquinimex; rubiginone B1; ruboxyl; safingol; saintopin; SarCNU; sarcophytol A; sargramostim; Sdi 1 mimetics; semustine; senescence derived inhibitor 1; sense oligonucleotides; signal transduction inhibitors; signal transduction modulators; single chain antigen-binding protein; sizofuran; sobuzoxane; sodium borocaptate; sodium phenylacetate; solverol; somatomedin binding protein; sonermin; sparfosic acid; spicamycin D; spiromustine; splenopentin; spongistatin 1; squalamine; stem cell inhibitor; stem-cell division inhibitors; stipiamide; stromelysin inhibitors; sulfinosine; superactive vasoactive intestinal peptide antagonist; suradista; suramin; swainsonine; synthetic glycosaminoglycans; tallimustine; tamoxifen methiodide; tauromustine; tazarotene; tecogalan sodium; tegafur; tellurapyrylium; telomerase inhibitors; temoporfin; temozolomide; teniposide; tetrachlorodecaoxide; tetrazomine; thaliblastine; thiocoraline; thrombopoietin; thrombopoietin mimetic; thymalfasin; thymopoietin receptor agonist; thymotrinan; thyroid stimulating hormone; tin ethyl etiopurpurin; tirapazamine; titanocene bichloride; topsentin; toremifene; totipotent stem cell factor; translation inhibitors; tretinoin; triacetyluridine; triciribine; trimetrexate; triptorelin; tropisetron; turosteride; tyrosine kinase inhibitors; tyrphostins; UBC inhibitors; ubenimex; urogenital sinus-derived growth inhibitory factor; urokinase receptor antagonists; vapreotide; variolin B; vector system, erythrocyte gene therapy; velaresol; veramine; verdins; verteporfin; vinorelbine; vinxaltine; vitaxin; vorozole; zanoterone; zeniplatin; zilascorb; zinostatin stimalamer, Adriamycin, Dactinomycin, Bleomycin, Vinblastine, Cisplatin, acivicin; aclarubicin; acodazole hydrochloride; acronine; adozelesin; aldesleukin; altretamine; ambomycin; ametantrone acetate; aminoglutethimide; amsacrine; anastrozole; anthramycin; asparaginase; asperlin; azacitidine; azetepa; azotomycin; batimastat; benzodepa; bicalutamide; bisantrene hydrochloride; bisnafide dimesylate; bizelesin; bleomycin sulfate; brequinar sodium; bropirimine; busulfan; cactinomycin; calusterone; caracemide; carbetimer; carboplatin; carmustine; carubicin hydrochloride; carzelesin; cedefingol; chlorambucil; cirolemycin; cladribine; crisnatol mesylate; cyclophosphamide; cytarabine; dacarbazine; daunorubicin hydrochloride; decitabine; dexormaplatin; dezaguanine; dezaguanine mesylate; diaziquone; doxorubicin; doxorubicin hydrochloride; droloxifene; droloxifene citrate; dromostanolone propionate; duazomycin; edatrexate; eflornithine hydrochloride; elsamitrucin; enloplatin; enpromate; epipropidine; epirubicin hydrochloride; erbulozole; esorubicin hydrochloride; estramustine; estramustine phosphate sodium; etanidazole; etoposide; etoposide phosphate; etoprine; fadrozole hydrochloride; fazarabine; fenretinide; floxuridine; fludarabine phosphate; fluorouracil; fluorocitabine; fosquidone; fostriecin sodium; gemcitabine; gemcitabine hydrochloride; hydroxyurea; idarubicin hydrochloride; ifosfamide; iimofosine; interleukin I1 (including recombinant interleukin II, or rIL.sub.2), interferon alfa-2a; interferon alfa-2b; interferon alfa-n1; interferon alfa-n3; interferon beta-1a; interferon gamma-1b; iproplatin; irinotecan hydrochloride; lanreotide acetate; letrozole; leuprolide acetate; liarozole hydrochloride; lometrexol sodium; lomustine; losoxantrone hydrochloride; masoprocol; maytansine; mechlorethamine hydrochloride; megestrol acetate; melengestrol acetate; melphalan; menogaril; mercaptopurine; methotrexate; methotrexate sodium; metoprine; meturedepa; mitindomide; mitocarcin; mitocromin; mitogillin; mitomalcin; mitomycin; mitosper; mitotane; mitoxantrone hydrochloride; mycophenolic acid; nocodazoie; nogalamycin; ormaplatin; oxisuran; pegaspargase; peliomycin; pentamustine; peplomycin sulfate; perfosfamide; pipobroman; piposulfan; piroxantrone hydrochloride; plicamycin; plomestane; porfimer sodium; porfiromycin; prednimustine; procarbazine hydrochloride; puromycin; puromycin hydrochloride; pyrazofurin; riboprine; rogletimide; safingol; safingol hydrochloride; semustine; simtrazene; sparfosate sodium; sparsomycin; spirogermanium hydrochloride; spiromustine; spiroplatin; streptonigrin; streptozocin; sulofenur; talisomycin; tecogalan sodium; tegafur; teloxantrone hydrochloride; temoporfin; teniposide; teroxirone; testolactone; thiamiprine; thioguanine; thiotepa; tiazofurin; tirapazamine; toremifene citrate; trestolone acetate; triciribine phosphate; trimetrexate; trimetrexate glucuronate; triptorelin; tubulozole hydrochloride; uracil mustard; uredepa; vapreotide; verteporfin; vinblastine sulfate; vincristine sulfate; vindesine; vindesine sulfate; vinepidine sulfate; vinglycinate sulfate; vinleurosine sulfate; vinorelbine tartrate; vinrosidine sulfate; vinzolidine sulfate; vorozole; zeniplatin; zinostatin; zorubicin hydrochloride, drugs that arrest cells in the G2-M phases and/or modulate the formation or stability of microtubules, (e.g. Taxol™ (i.e. paclitaxel), Taxotere™, compounds comprising the taxane skeleton, Erbulozole (i.e. R-55104), Dolastatin 10 (i.e. DLS-10 and NSC-376128), Mivobulin isethionate (i.e. as CI-980), Vincristine, NSC-639829, Discodermolide (i.e. as NVP-XX-A-296), ABT-751 (Abbott, i.e. E-7010), Altorhyrtins (e.g. Altorhyrtin A and Altorhyrtin C), Spongistatins (e.g. Spongistatin 1, Spongistatin 2, Spongistatin 3, Spongistatin 4, Spongistatin 5, Spongistatin 6, Spongistatin 7, Spongistatin 8, and Spongistatin 9), Cemadotin hydrochloride (i.e. LU-103793 and NSC-D-669356), Epothilones (e.g. Epothilone A, Epothilone B, Epothilone C (i.e. desoxyepothilone A or dEpoA), Epothilone D (i.e. KOS-862, dEpoB, and desoxyepothilone B), Epothilone E, Epothilone F, Epothilone B N-oxide, Epothilone A N-oxide, 16-aza-epothilone B, 21-aminoepothilone B (i.e. BMS-310705), 21-hydroxyepothilone D (i.e. Desoxyepothilone F and dEpoF), 26-fluoroepothilone, Auristatin PE (i.e. NSC-654663), Soblidotin (i.e. TZT-1027), LS-4559-P (Pharmacia, i.e. LS-4577), LS-4578 (Pharmacia, i.e. LS-477-P), LS-4477 (Pharmacia), LS-4559 (Pharmacia), RPR-112378 (Aventis), Vincristine sulfate, DZ-3358 (Daiichi), FR-182877 (Fujisawa, i.e. WS-9885B), GS-164 (Takeda), GS-198 (Takeda), KAR-2 (Hungarian Academy of Sciences), BSF-223651 (BASF, i.e. ILX-651 and LU-223651), SAH-49960 (Lilly/Novartis), SDZ-268970 (Lilly/Novartis), AM-97 (Armad/Kyowa Hakko), AM-132 (Armad), AM-138 (Armad/Kyowa Hakko), IDN-5005 (Indena), Cryptophycin 52 (i.e. LY-355703), AC-7739 (Ajinomoto, i.e. AVE-8063A and CS-39·HCl), AC-7700 (Ajinomoto, i.e. AVE-8062, AVE-8062A, CS-39-L-Ser·HCl, and RPR-258062A), Vitilevuamide, Tubulysin A, Canadensol, Centaureidin (i.e. NSC-106969), T-138067 (Tularik, i.e. T-67, TL-138067 and TI-138067), COBRA-1 (Parker Hughes Institute, i.e. DDE-261 and WHI-261), H10 (Kansas State University), H16 (Kansas State University), Oncocidin A1 (i.e. BTO-956 and DAIE), DDE-313 (Parker Hughes Institute), Fijianolide B, Laulimalide, SPA-2 (Parker Hughes Institute), SPA-1 (Parker Hughes Institute, i.e. SPIKET-P), 3-IAABU (Cytoskeleton/Mt. Sinai School of Medicine, i.e. MF-569), Narcosine (also known as NSC-5366), Nascapine, D-24851 (Asta Medica), A-105972 (Abbott), Hemiasterlin, 3-BAABU (Cytoskeleton/Mt. Sinai School of Medicine, i.e. MF-191), TMPN (Arizona State University), Vanadocene acetylacetonate, T-138026 (Tularik), Monsatrol, lnanocine (i.e. NSC-698666), 3-IAABE (Cytoskeleton/Mt. Sinai School of Medicine), A-204197 (Abbott), T-607 (Tuiarik, i.e. T-900607), RPR-115781 (Aventis), Eleutherobins (such as Desmethyleleutherobin, Desaetyleleutherobin, Isoeleutherobin A, and Z-Eleutherobin), Caribaeoside, Caribaeolin, Halichondrin B, D-64131 (Asta Medica), D-68144 (Asta Medica), Diazonamide A, A-293620 (Abbott), NPI-2350 (Nereus), Taccalonolide A, TUB-245 (Aventis), A-259754 (Abbott), Diozostatin, (−)-Phenylahistin (i.e. NSCL-96F037), D-68838 (Asta Medica), D-68836 (Asta Medica), Myoseverin B, D-43411 (Zentaris, i.e. D-81862), A-289099 (Abbott), A-318315 (Abbott), HTI-286 (i.e. SPA-110, trifluoroacetate salt) (Wyeth), D-82317 (Zentaris), D-82318 (Zentaris), SC-12983 (NCI), Resverastatin phosphate sodium, BPR-OY-007 (National Health Research Institutes), and SSR-250411 (Sanofi)), steroids (e.g., dexamethasone), finasteride, aromatase inhibitors, gonadotropin-releasing hormone agonists (GnRH) such as goserelin or leuprolide, adrenocorticosteroids (e.g., prednisone), progestins (e.g., hydroxyprogesterone caproate, megestrol acetate, medroxyprogesterone acetate), estrogens (e.g., diethylstilbestrol, ethinyl estradiol), antiestrogen (e.g., tamoxifen), androgens (e.g., testosterone propionate, fluoxymesterone), antiandrogen (e.g., flutamide), immunostimulants (e.g., Bacillus Calmette-Guerin (BCG), levamisole, interleukin-2, alpha-interferon, etc.), monoclonal antibodies (e.g., anti-CD20, anti-HER2, anti-CD52, anti-HLA-DR, and anti-VEGF monoclonal antibodies), immunotoxins (e.g., anti-CD33 monoclonal antibody-calicheamicin conjugate, anti-CD22 monoclonal antibody-*Pseudomonas* exotoxin conjugate, etc.), immunotherapy (e.g., cellular immunotherapy, antibody therapy, cytokine therapy, combination immunotherapy, etc.), radioimmunotherapy (e.g., anti-CD20 monoclonal antibody conjugated to $^{111}$In, $^{90}$Y, or $^{131}$I, etc.), immune checkpoint inhibitors (e.g., CTLA4 blockade, PD-1 inhibitors, PD-L1 inhibitors, etc.), triptolide, homoharringtonine, dactinomycin, doxorubicin, epirubicin, topotecan, itraconazole, vindesine, cerivastatin, vincristine, deoxyadenosine, sertraline, pitavastatin, irinotecan, clofazimine, 5-nonyloxytryptamine, vemurafenib, dabrafenib, erlotinib, gefitinib, EGFR inhibitors, epidermal growth factor receptor (EGFR)-targeted therapy or therapeutic (e.g. gefitinib (Iressa™), erlotinib (Tarceva™), cetuximab (Erbitux™), lapatinib (Tykerb™), panitumumab (Vectibix™), vandetanib (Caprelsa™), afatinib/BIBW2992, CI-1033/canertinib, neratinib/HKI-272, CP-724714, TAK-285, AST-1306, ARRY334543, ARRY-380, AG-1478, dacomitinib/PF299804, OSI-420/desmethyl erlotinib, AZD8931, AEE788, pelitinib/EKB-569, CUDC-101, WZ8040, WZ4002, WZ3146, AG-490, XL647, PD153035, BMS-599626), sorafenib, imatinib, sunitinib, dasatinib, or the like. In preferred embodiments, the anti-cancer drug is gemcitabine (GMC).

Although the description herein provided refers to the detection of the GMC with the substrate of the present disclosure, it may be understood by a person skilled in the art that aspects of the present disclosure may be directed to the detection of other drugs as well, as may be obvious to a person skilled in the art.

The substrate may be coated with one or more layers of a nanomaterial on the surface of the substrate. In some embodiments, the substrate is any material suitable for a SERS substrate known in the art, including silicon, filter paper, polymer, glass, silicon nitride, quartz, ceramics, sapphire, metal, or a combination thereof. In some embodiment, the filter paper is made with cellulose. In some embodiments, the one or more layers are applied until a thickness of 1 to 50 micrometers (μm) is achieved, preferably 10 to 40 μm, or 20 to 30 μm. In some embodiments, the nanomaterial is coated onto the substrate by any method known in the art including, drop casting, spin coating, doctor blading or using an automatic coating instrument. In an embodiment, the nanomaterial is coated on at least 50% of an outer surface of the substrate, preferably at least 60%, 70%, 80%, 90%, or 100%.

In an embodiment, the nanomaterial includes an MXene. The MXene may include at least one metal selected from the group consisting of Ti, V, Nc, Mo, W, Y, Zr, Hf, Ta, Cr, Sc, along with at least one of a carbide, nitride, or a carbonitride. In a preferred embodiment, the nanomaterial includes a $V_2CT_x$ MXene. In some embodiments, $T_x$ is at least one selected from the group consisting of hydroxide (—OH), oxygen (—O), and fluorine (—F).

The $V_2CT_x$ MXene includes 40-60 wt. % vanadium (V), preferably 45-55 wt. %, or approximately 50 wt. %, 10-30 wt. % carbon (C), preferably 15-25 wt. %, or approximately 20 wt. %, 5-25 wt. % O, preferably 10 to 20 wt. %, or approximately 15 wt. %, and 0.1-2 wt. % F, preferably 0.5-1.5 wt. %, or approximately 1 wt. %. The $V_2CT_x$ MXene does not include aluminum (Al). In some embodiments, the $V_2CT_x$ MXene is in the form of delaminated layered flakes. The flakes have the longest dimension of 1-20 μm, preferably 5-15 μm, or approximately 10 μm. In some embodiments, the flakes have a thickness of 1-10 nanometers (nm), preferably 2-8 nm, or 4-6 nm. In some embodiments, the flakes are stacked directly on top of one another. In some embodiments, the spacing between layers of the flakes is 6-10 Angstroms (Å), preferably 7-9 Å or approximately 8.

The spacing between the flakes is variable based on the size of the intercalant. The intercalants cleave the multilayered MXenes and convert them into few-layered two-dimensional (2D) flakes with interlayer spacing. In some embodiments, the intercalant is selected from the group consisting of tetramethylammonium hydroxide (TMAOH), tetraethylammonium hydroxide (TEAOH), tetrapropylammonium hydroxide (TPAOH), tetrabutylammonium hydroxide (TBAOH), triethylamine, hydrazine hydrate, urea, dimethyl sulfoxide (DMSO), metal ions, and water. Larger intercalants such as TMAOH and TBAOH tend to form defects in flakes, resulting in early oxidation, low zeta potential, and increased band gap. Whereas small-sized intercalants, such as metal ions, lead to the flocculation, crumpling, and re-stacking of MXenes flakes. In a preferred embodiment, the intercalant has a hydrated radii of 1-6 Å, preferably 2-5 Å, or 3-4 Å. In some embodiments, the intercalant is triethylamine.

In some embodiments, the $V_2CT_x$ MXene may be made by the following method. The method includes making the $V_2AlC$ ternary carbide MAX phase by mixing powders of aluminum, vanadium, and graphite in any desired ratio, preferably a 2:1:1 M ratio, and heating the mixture to a temperature of 1,000-2,000° C., preferably 1,200-1,800° C., or 1,400-1,600° C. The $V_2CT_x$ MXene is then made from the $V_2AlC$ ternary carbide MAX phase by adding an etchant such as hydrofluoric acid, hydrochloric acid, sulfuric acid, or combinations thereof. Following etching the material is soaked in a solution of the intercalant, such as triethylamine, to make the $V_2CT_x$ MXene used in the nanomaterial.

Although the description herein provided refers to the method of making a $V_2CT_x$ MXene, it may be understood by a person skilled in the art that aspects of the present disclosure may be directed to the other MXenes as well, as may be obvious to a person skilled in the art.

The nanomaterial further includes silver nanoparticles (AgNPs). In general, the nanoparticles can be any shape known to one of ordinary skill in the art. Examples of suitable shapes the nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplates, nanodisks, rods (also known as nanorods), and mixtures thereof. In a preferred embodiment, the nanoparticles are spherical. In some embodiments, the silver nanoparticles have an average diameter of 5-60 nm, preferably 10-50 nm, 20-40 nm, or approximately 30 nm. In some embodiments, the silver nanoparticles have a bimodal size distribution with a first set having an average diameter of 1-5 nm, preferably 2-4 nm, or approximately 3 nm, and a second set having an average diameter of 20-30 nm, preferably 22-28 nm, or 24-26 nm. In some embodiments, the first set of silver nanoparticles are aggregated on the outer surface of the substrate, and the aggregates have an average size of 10-30 nm, preferably 15-25 nm, or approximately 20 nm.

In some embodiments, the silver nanoparticles are stabilized with a capping agent such as citric acid, polyethylene glycol (PEG), ethylenediaminetetraacetic acid (EDTA), polyvinyl pyrrolidone (PVP) and polyvinyl alcohol (PVA). In some embodiments, the nanoparticles include several functional groups, such as amine, hydroxyl, carboxylic acid, and/or carbonyl groups, on their surface. In some embodiments, the outer surface of the silver nanoparticles have carboxylic acid groups. In some embodiments, the silver nanoparticles are distributed on an outer surface of the $V_2CT_x$ MXene in the nanomaterial. The silver nanoparticles are not intercalated between the flakes of the $V_2CT_x$ MXene.

At step 104, the method 100 includes measuring a Raman signal of the anti-cancer drug in the solution. In Raman spectroscopy, the sample is illuminated with light, and a small portion of the photons will scatter at a different frequency than the incident light, called the Raman effect. These different frequency photons can give insight to vibrational energy modes of a sample, and allow for characterization of the components, however due to the small portion of Raman scattering, the signal is inherently low. Due to the weak nature of its scattered light, measuring the Raman signal of the anti-cancer drug alone would not provide a strong enough signal for sensitive detection. Therefore, SERS is employed to provide an enhanced signal by absorbing light and generating a localized electromagnetic (EM) field.

In the case of the present disclosure, the substrate acts as a SERS substrate. When the substrate is contacted with the solution, the anti-cancer drug interacts with the nanomaterial on the outer surface of the substrate in the solution. In some embodiments, the anti-cancer drug is irradiated with a laser light having a wavelength of 600-700 nm, preferably from 625 to 675 nm, and more particularly at about 633 nm. The irradiation is performed for a time sufficient period of time to generate a Raman signal. In some exemplary embodiments, the period of time ranges from less that about 1 second to about 3 hours, preferably 10 seconds to 5 minutes. Raman spectroscopy is then measured on the anti-cancer drug which is interacting with the nanomaterial on the substrate.

In some embodiments, an intensity of the Raman signal linearly correlates with an amount of the anti-cancer drug in the solution. In other words, the higher the intensity of the signal, the greater the concentration of anti-cancer drug in the solution. The amount of anti-cancer drug in the solution can be quantified based on the intensity of the Raman signal. In some embodiments, an intensity of the Raman signal is $10^5$ to $10^9$ greater, preferably $10^6$, $10^7$, or 108 times greater than a same solution but without contacting the substrate. In other words, if the anti-cancer drug is not interacting with the substrate and generating a SERS signal, then the Raman signal of the anti-cancer drug alone is much smaller. The method of the present disclosure effectively detects the anti-cancer drug in the solution, at low concentration, up to the order of $1 \times 10^{-2}$ Molar (M).

In some embodiments, the silver nanoparticles interact with the anti-cancer drug and the $V_2CT_x$ MXene via charge transfer interactions. While not wishing to be bound to a single theory, it is thought that the AgNPs function as a charge transport bridge and a plasmonic compact between GMC molecules and $V_2CT_x$ MXene, resulting in Raman signal enhancement.

EXAMPLES

The following examples demonstrate a method of detecting an anti-cancer drug in a solution, as described herein. The examples are provided solely for illustration and are not to be construed as limitations of the present disclosure, as many variations thereof are possible without departing from the spirit and scope of the present disclosure.

Example 1: Reagents

Vanadium pentoxide ($V_2O_5$, 99.9%), silver nitrate ($AgNO_3$, 99.8%) hydrofluoric acid (HF, 48-54%), dimethyl sulfoxide (DMSO, A.R), and n-hexane ($C_6H_{14}$, A.R) were purchased from Sigma Aldrich. Graphite (99.8%), sodium citrate ($C_6H_5Na_3O_7 \cdot 2H_2O$, >99%), citric acid (99%), and sodium borohydride ($NaBH_4$, 98.9%) were obtained from Alfa Aesar. Aluminum powder (260 micrometers (μm) >90%) and Cytiva Whatman™ Nylon membrane (47 milliliters (mm) with pore size 0.45 m) were purchased from Fisher Scientific. Gemcitabine hydrochloride (99.8%) was purchased from Ambeed Pharmaceuticals United States of America (USA). All the chemicals were used without further modification. De-ionized water was used for all required solution preparation.

Example 2: Characterization Methods

XRD pattern was recorded using an Ultima IV multipurpose X-ray diffraction instrument. The UV-Vis absorption spectra were measured in a dispersed state in water on Agilent Cary 60. Surface morphology was studied by Field emission scanning electron microscopy (FE-SEM) and Energy dispersive X-ray spectroscopy (EDS) using JEM-2100F Field Emission Microscope (Model: JEOL-USA) at 200 kilovolts (KV) speeding up voltage. A high-resolution transmission electron microscope (HR-TEM) was recorded on Tecnai G2 20 S-TWIN, D 2012. The Raman spectra were collected on a HORIBA Scientific LabRAM HR microscope equipped with an internal He—Ne 17 milliwatts (mW) red laser at 633 nm excitation wavelength. Raman parameters of 25% laser power, 20 sec. acquisition time, 4 times accumulation and a 50× objective lens were used.

Example 3: Synthesis of Silver Nanoparticles (AgNPs)

The AgNPs were prepared by a reduction method. For this purpose, 0.1 mL of 0.10 M $AgNO_3$ solution was added into a round bottom flask along with 3.4 mL of 0.17 M sodium citrate, followed by the addition of 0.6 mL of 0.17 M citric acid as a capping drug. The mixture was kept at room temperature for 3 minutes, and then 0.2 mL (0.5 mM) of freshly prepared $NaBH_4$ was added dropwise under constant stirring, and the reaction mixture was allowed to stand for 5 min. The mixture was then boiled to 100° C. for 20 min and cooled on an ice bath to control the uniform size distribution of the formed AgNPs.

Example 4: MAX Phase and Nanolayered MXenes Sheets

Figure 2:
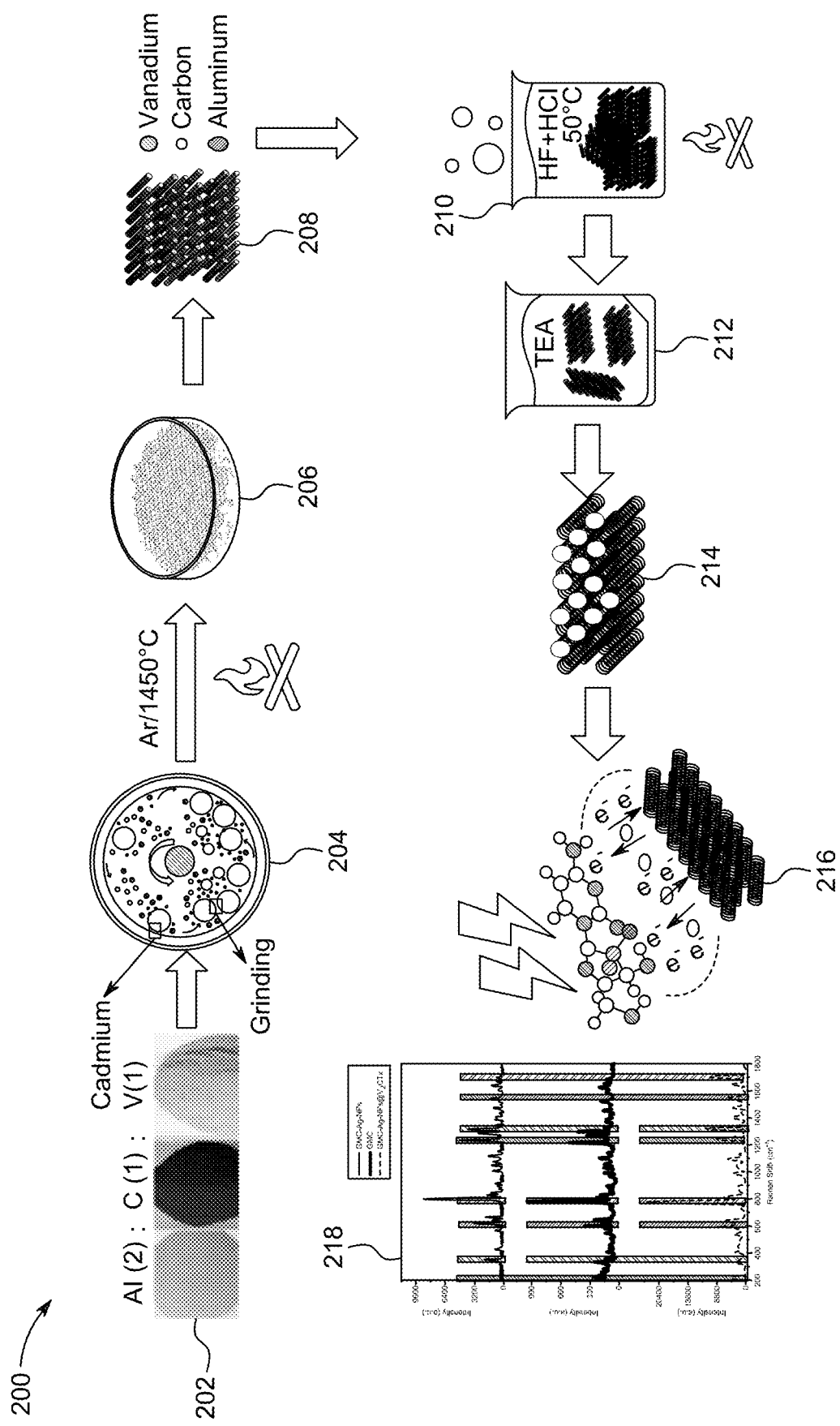
FIG. 2 is a schematic representation of the synthesis of a silver nanoparticle vanadium-based MXene hybrid surface-enhanced Raman scattering (SERS) substrate (AgNPs@$V_2CT_x$) MAX phase, followed by loading of gemcitabine (GMC) drug for SERS study, according to certain embodiments.

FIG. 2 shows the schematic representation of the synthesis of AgNPs@$V_2CT_x$ hybrid SERS substrate MAX phase, followed by the loading of GMC drug for the SERS study (200). A $V_2AlC$ ternary carbide MAX phase was synthesized following the reported literature with some modifications. The process was initiated by mixing commercially available powders of aluminum (Al, 200 mesh), vanadium (V, 300 mesh), and graphite (C, 200 mesh) in a 2:1:1 M ratio (202). The powder was finely ground to 100 mesh size using a dual mixer/mill (SPEX Sample Prep. 8000 D) (204). The finely ground mixture was transferred into an alumina heating boat and annealed at 1450° C. under Argon flow in the tubular furnace (Carbolyte STF 15/450) for 4 hours with a heating ramp of 10° C. $min^{-1}$ and then cooled down to room temperature (206). The aluminum contents were kept slightly higher to avoid loss due to its low melting point (660° C.) (208). The mixture was then washed to remove impurities with 10 M $H_3PO_4$ for 8 hours at 90° C., followed by redistribution in distilled water and sonicated for 5 min. The solution was allowed to settle overnight at room temperature and collected for further study.

Example 5: Synthesis of $V_2CT_x$ MXene

Figure 3B:
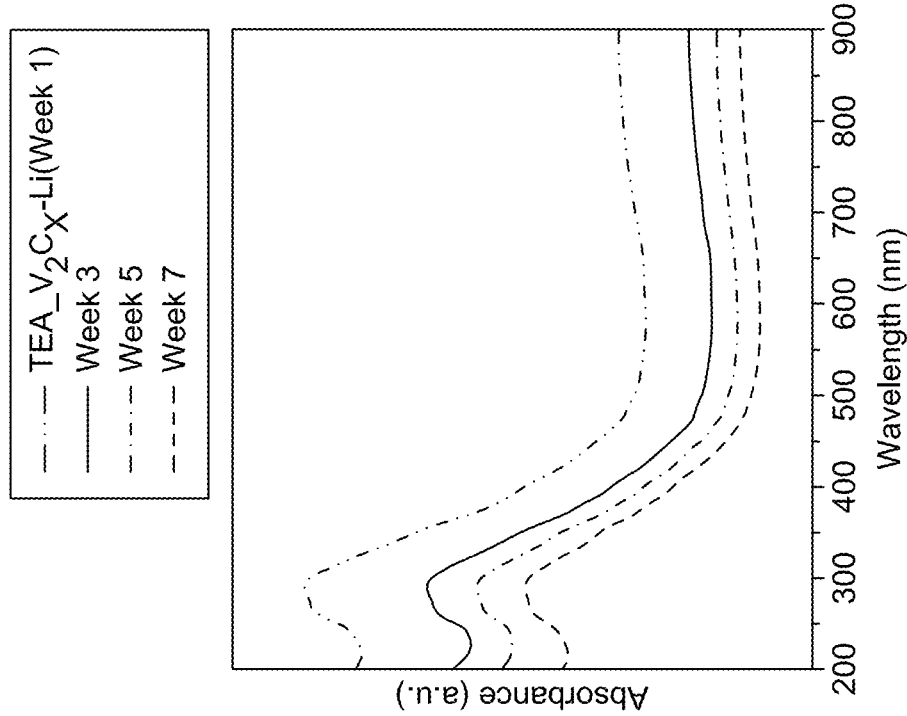
FIG. 3B illustrates UV-Vis. spectra of the SERS spectrum of the $V_2CT_x$ MXenes, after ion exchange, depicting the stability for 7 weeks, according to certain embodiments.
Figure 3A:
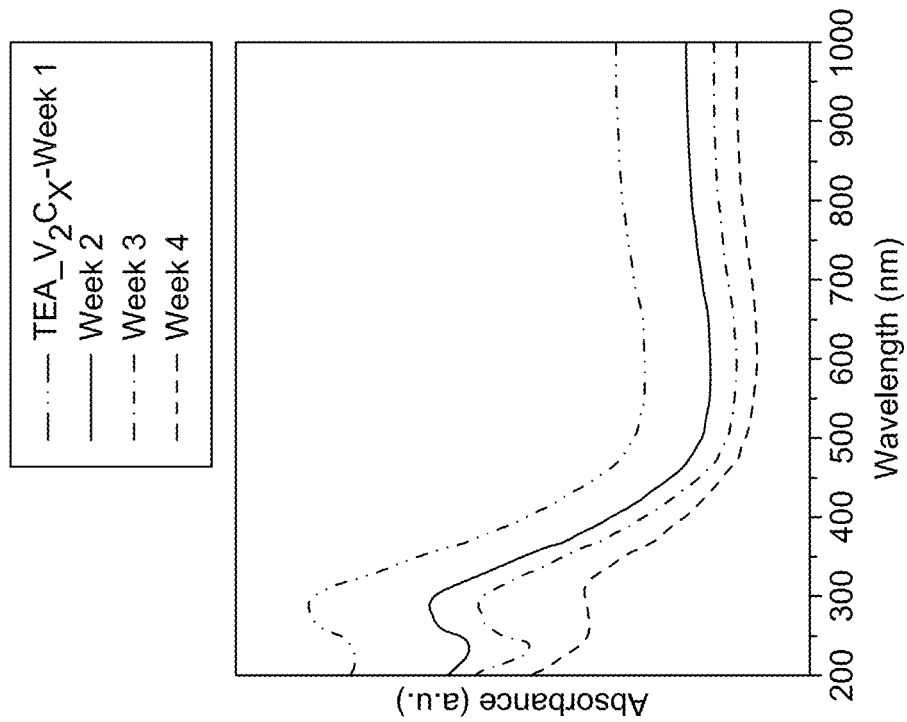
FIG. 3A illustrates an ultraviolet-visible (UV-Vis.) spectra of triethylamine (TEA) intercalated $V_2CT_x$ MXenes showing stability for 4 weeks, according to certain embodiments.

MXenes are hexagonally shaped (P63/mmc symmetry) two-dimensional (2D)-layered materials with general representation $M_{n+1}X_nT_x$, where M is the transition metal, X is C and/or N, and $T_x$ is the terminal groups (—OH, —O, and F), while n=1, 2 or 3. The $V_2CT_x$ MXenes were obtained using a reported method after slight modification. A mixture of hydrofluoric acid (48%) and hydrochloric acid (12 M) was used as an etchant (210), and triethylamine (TEA) was used as an intercalant to intercalate the MXene flakes (212). The $V_2AlC$ MAX phase was gradually mixed with 20 mL of mixture (12 mL HF and 8 mL HCl) solution in an ice bath for 10 min (to avoid exothermic reaction) with constant stirring at 200 revolutions per minute (rpm). Subsequently, the bottle was transferred to an oil bath to initiate the etching at 50° C. temperature at 400 rpm for 48 hours in a Teflon jar covered with a loosely bound lid in the fume hood. The product was washed and centrifuged multiple times (3500 rpm, 5 min/cycle) with distilled water and ethanol; alternatively, the first supernatant was decanted as waste to remove the salts, dissolved residual metals, and the nanosized MAX phase. The sedimented multilayer MXenes were repeatedly washed until the pH of the solution became neutral. The obtained product was filtered using Cytiva Whatman™ Nylon membrane (47 mm with pore size 0.45 m) with nearly 50-55% yield. The filtrate was dispersed into 10% TEA solution (1 g/20 mL) at room temperature and kept under stirring for 6 hours (212). The intercalated $V_2CT_x$ MXenes powder was centrifuged at 2500 rpm for 5 minutes, followed by sonication in water:ethanol (1:1) washing solution; the supernatant was collected each time until the supernatant turned transparent. The stability of the MXenes was checked at different time intervals using a UV-Visible spectrophotometer. FIG. 3A shows the 4-week stability without ion exchange, while FIG. 3B shows the 7-week-long stability after processing the ion exchange process with cold 0.01 M Lithium chloride (LiCl) solution.

Example 6: SERS Active Substrate

The SERS substrate was fabricated following previously reported methods (FIG. 2). The film was prepared by spin-casting the diluted aqueous solution (50 µg $mL^{-1}$) of $V_2CT_x$ colloidal delaminated flakes on filter paper (Whatman™ 20). The film thickness was adjusted to ~ 15 m by multiple spin-cast runs and vacuum dried at 60° C. First, AgNPs were self-assembled in a petridish using an n-hexane/water interface. It was followed by the slow addition of ethanol to extract the NPs from the solution and redistribute them at the n-hexane/water interface. Then the MXene-coated filter paper was immersed in the petri dish to disperse the AgNPs on the MXene surface. Finally, the filter paper was dried under a vacuum at room temperature to form the SERS substrate (214). The SERS substrate was further explored for its potential for traced detection of GMC (216). The Raman spectra for GMC-AgNPs, GMC, and GMC-AGNPs@$V_2CT_x$ were provided (218).

Figure 4A:
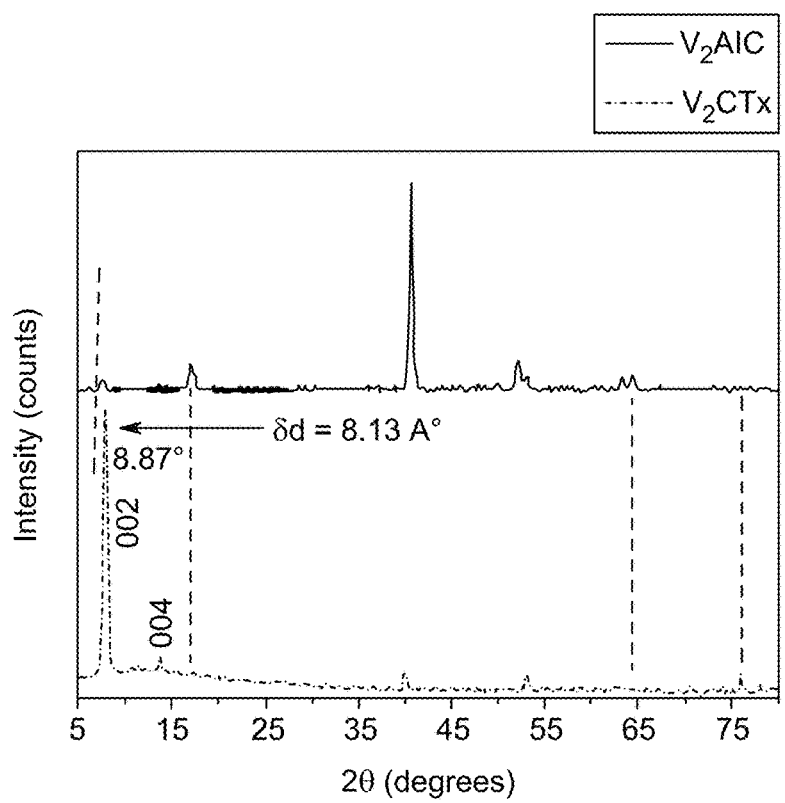
FIG. 4A illustrates an X-ray diffraction (XRD) spectra of the $V_2CT_x$ MXenes and $V_2AlC$ MAX phase, according to certain embodiments.
Figure 4B:
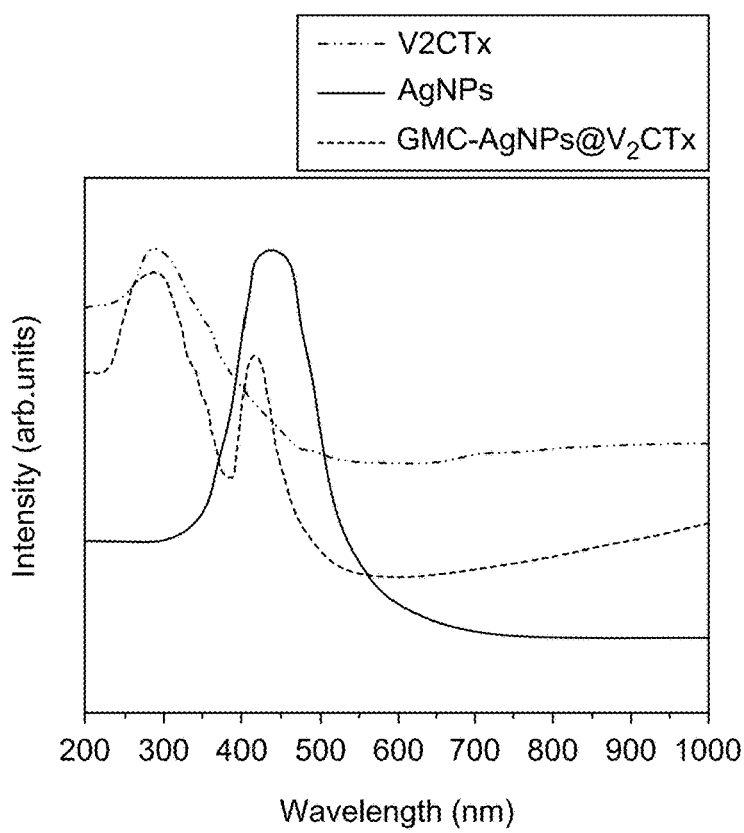
FIG. 4B illustrates an UV-Vis absorption spectra of $V_2CT_x$ flakes, pure AgNPs, and GMCAgNPs@$V_2CT_x$, according to certain embodiments.

Example 7: Properties of the Synthesized MAX Phase, $V_2CT_x$, and AgNPs-Loaded $V_2CT_x$ MXene To assess the morphology, lattice parameters, and optical properties of the precursor, TEA-intercalated $V_2CT_x$ MXenes, and AgNPs-loaded $V_2CT_x$ hybrid materials, the delaminated products were investigated by XRD, UV-vis, atomic force microscopy (AFM), FE-SEM, TEM, Raman, and Fourier transform infrared (FT-IR) techniques. FIG. 4A shows the diffraction analysis of XRD patterns for the precursor $V_2AlC$ MAX phase and the as-prepared delaminated $V_2CT_x$ MXene. The two prominent peaks at 17.750 and 41.910 were associated with the precursor MAX phase as per JCPDS No. 29-101. In the case of $V_2CT_x$, a new intense peak appeared at 8.87° corresponding to the (002) plane with a d-spacing of 8.13 Å. The decrease in the intensity of the peaks around 17.75° and 41.92° along with the waning of remaining residual peaks (non-basal peak 65.4°), indicated the successful removal of Al layers and the full delamination of $V_2AlC$ to a few-layered $V_2CT_x$ sheet. FIG. 4B shows the optical properties of the synthesized colloidal $V_2CT_x$ MXenes, AgNPs, and GMC-loaded AgNPs@$V_2CT_x$ MXenes were compared using UV-Visible spectroscopy. The UV-vis absorption band at 280 nm about $V_2CT_x$ resulted due to the localized surface plasmon, interband transition (IBT), or transversal mode with a small plateau below 280 nm, indicating the formation of a stable $V_2CT_x$ MXene phase with no sign of early oxidation. The $V_2CT_x$ spectra (dotted line) after loading with AgNPs and having the GMC drug molecules physiosorbed on the surface show changes in the two prominent bands at 270 nm and at 410 nm, along with some band broadening. Both bands showed a decrease in intensity accompanied by a blue shift to 452 nm describing the surface plasmonic resonance compared to pure $V_2CT_x$.

Figure 5:
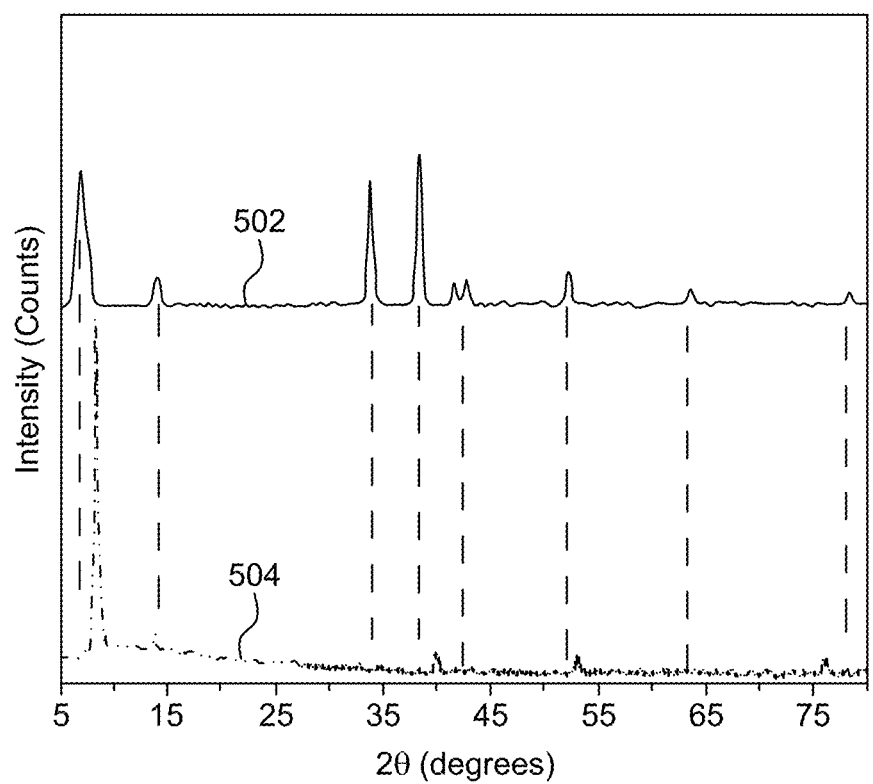
FIG. 5 illustrates an XRD pattern of AgNPs loaded $V_2CT_x$ and the $V_2CT_x$, according to certain embodiments.

FIG. 5 illustrates the XRD spectra of the as-prepared MXenes (504) and, after being loaded with AgNPs (502) as depicted in posture, the variation in the XRD patterns along with new intense peaks corresponding to (111), (200), (220), and (311) phases of AgNPs, further confirming the successful mobilization of the silver nanoparticles.

Figure 6:
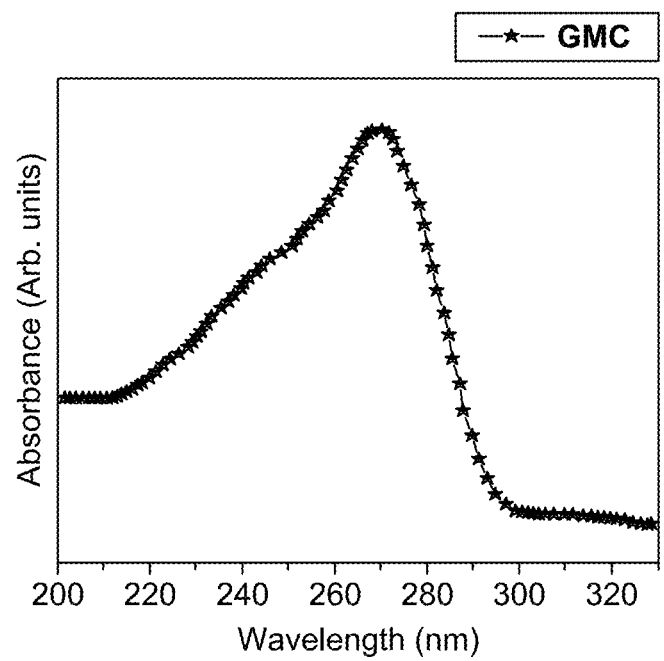
FIG. 6 illustrates a UV-Vis spectrum of free GMC drug, according to certain embodiments.

FIG. 6 illustrates a UV-Vis spectrum of a free GMC drug. From FIG. 6, it can be observed that free GMC molecules exhibited a characteristic UV-vis band at 268 nm; however, after being associated with AgNPs@$V_2CT_x$, a minor change, such as a band broadening with a slight shift to 270 nm (FIG. 4B), is observed. This is due to the strong interaction between the drug adsorbate molecules and the surface of the AgNPs@$V_2CT_x$ hybrid SERS substrate. Nevertheless, the drug molecules did not affect the chemistry of the $V_2CT_x$ due to the physisorption interaction. The blue shift and decreased intensity of the band at 410 nm is attributed to the interaction of the silver nanoparticles with GMC molecules. This phenomenon was the prime motivation for using AgNPs-loaded hybrid material as SERS active substrates. The band broadened along with a plateau observed below 270 nm, and the blue shift associated with a drop-in intensity at 410 nm gesture the successful charges-transfer and electromagnetically facilitated interaction between as developed hybrid material and drug molecules. The AFM image of the as-prepared $V_2CT_x$ MXenes (FIG. 4C) was taken by drop-casting on Si substrate. Moreover, (FIG. 4D) depicts the few-layered flakes with a thickness of ~5-5.5 nm.

Figure 4C:
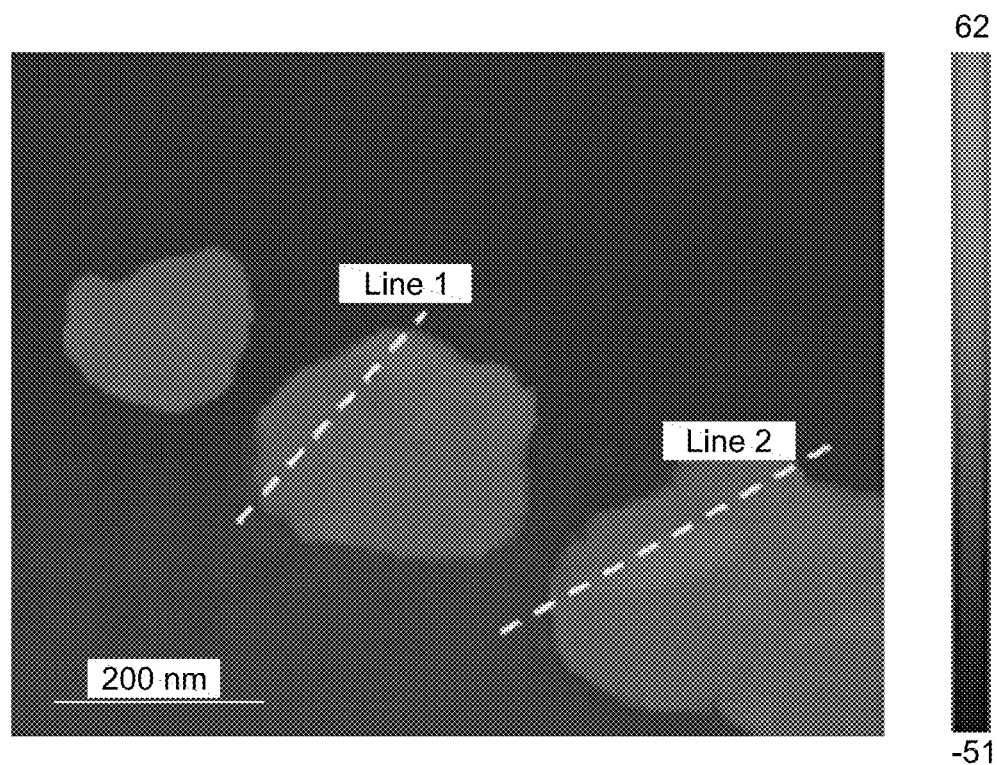
FIG. 4C illustrates an atomic force microscopy (AFM) image of the $V_2CT_x$ flakes, according to certain embodiments.
Figure 4D:
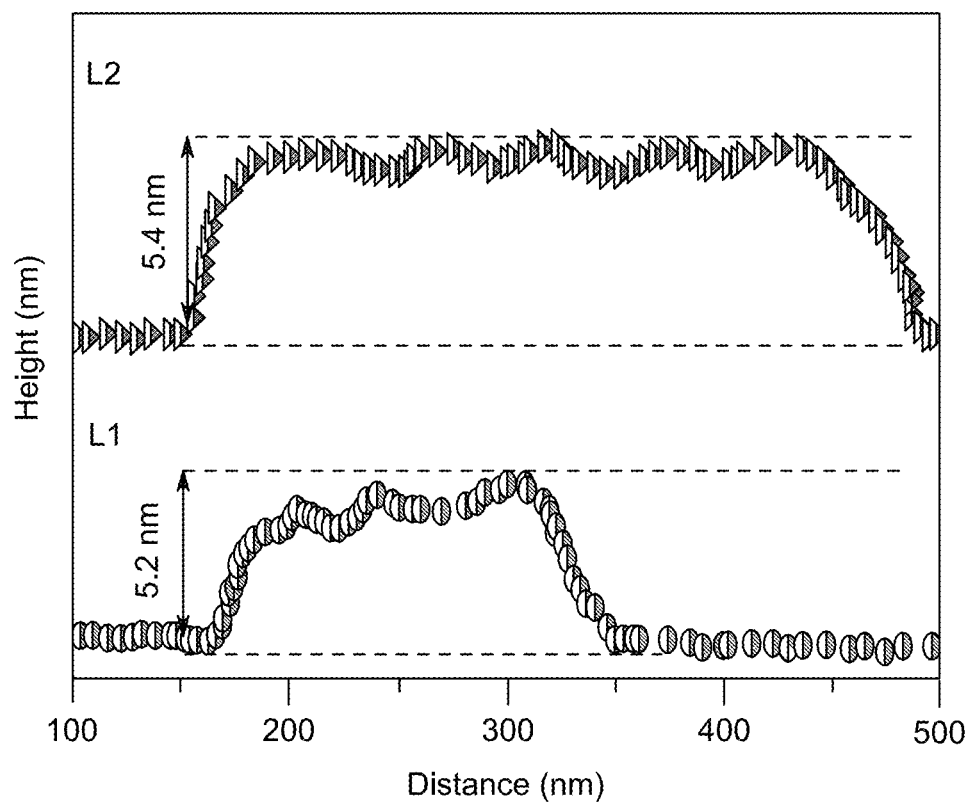
FIG. 4D illustrates a height profile for the $V_2CT_x$ MXenes flakes, according to certain embodiments.
Figure 7A:
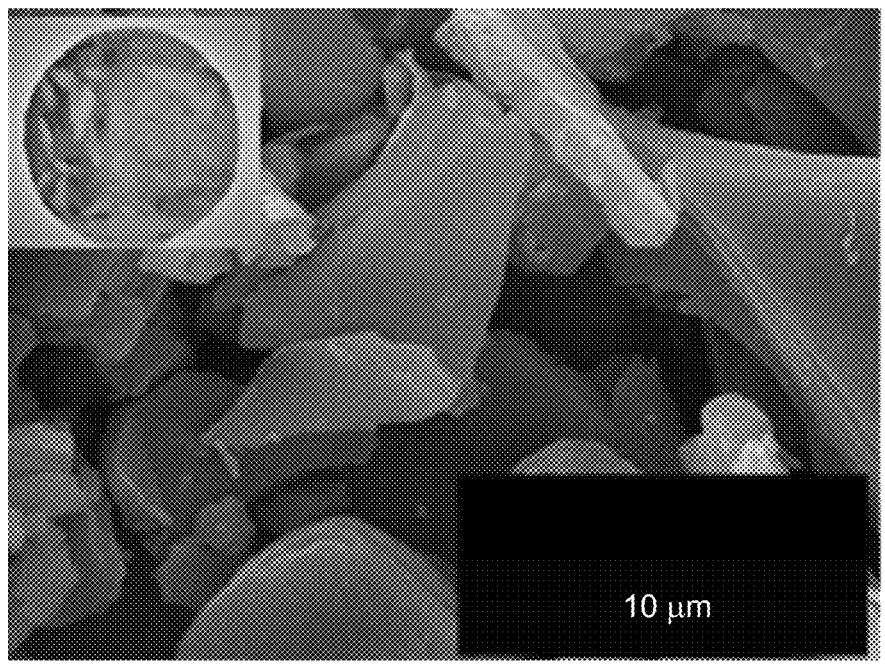
FIG. 7A illustrates a field emission scanning electron microscope (FE-SEM) images of the $V_2CT_x$ flakes and the inset shows the TEA-$V_2CT_x$ loaded in the paper, according to certain embodiments.
Figure 7B:
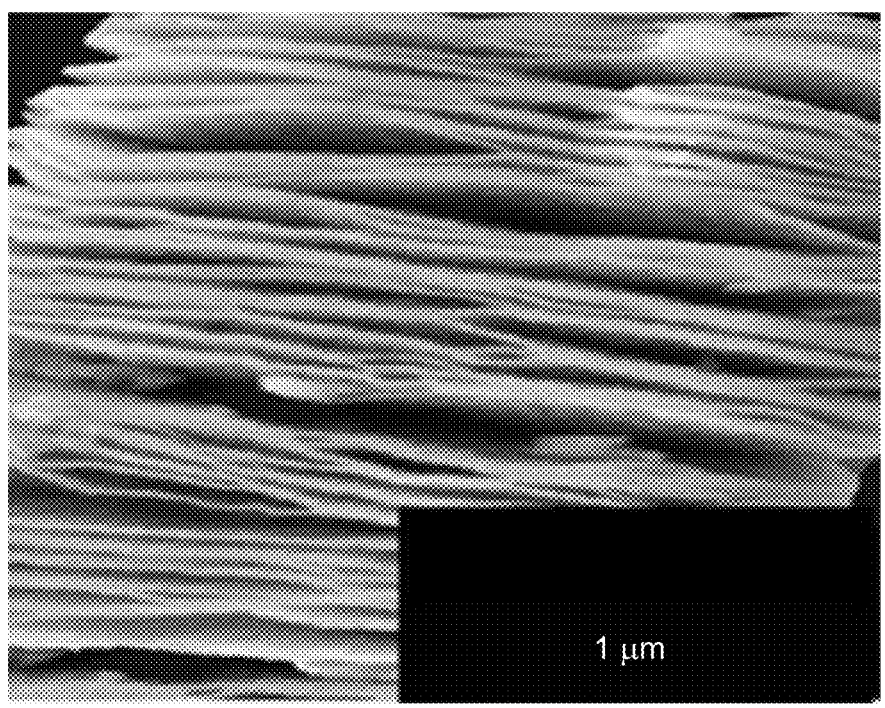
FIG. 7B illustrates an FE-SEM image of the $V_2CT_x$ delaminated flakes with high resolution, according to certain embodiments.
Figure 7C:
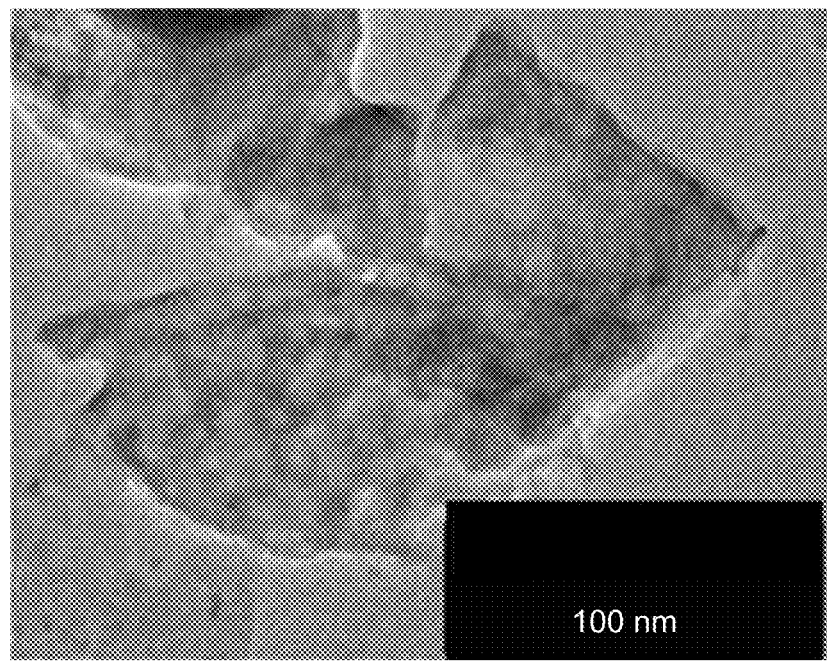
FIG. 7C illustrates a transmission electron microscope (TEM) image of the TEA-$V_2CT_x$ flakes, according to certain embodiments.
Figure 7D:
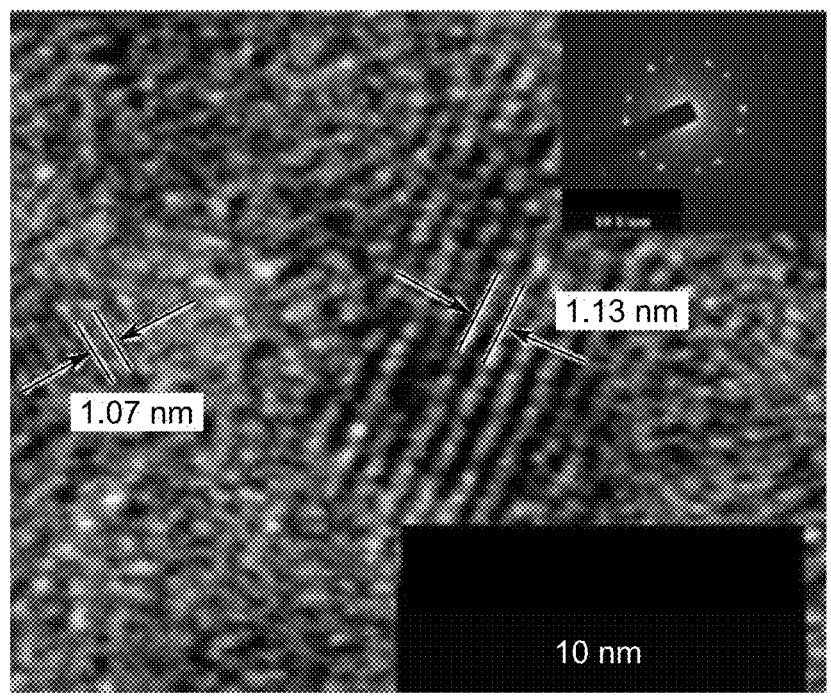
FIG. 7D illustrates a high-resolution TEM image of lattice fringes for the TEA-$V_2CT_x$, according to certain embodiments.
Figure 8A:
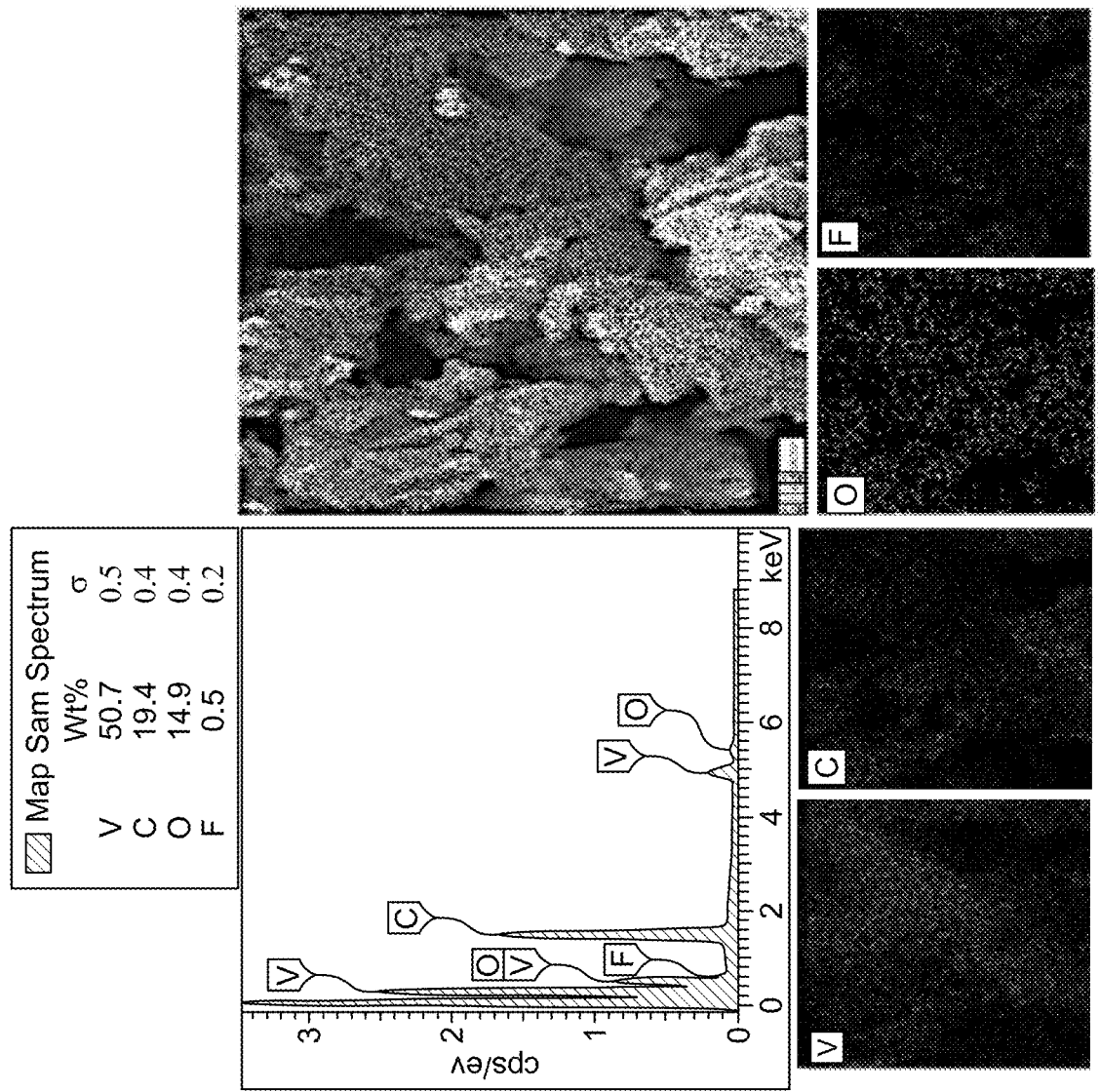
FIG. 8A illustrates an energy dispersive X-ray spectroscopy (EDS) and elemental mapping of the $V_2CT_x$, according to certain embodiments.
Figure 8B:
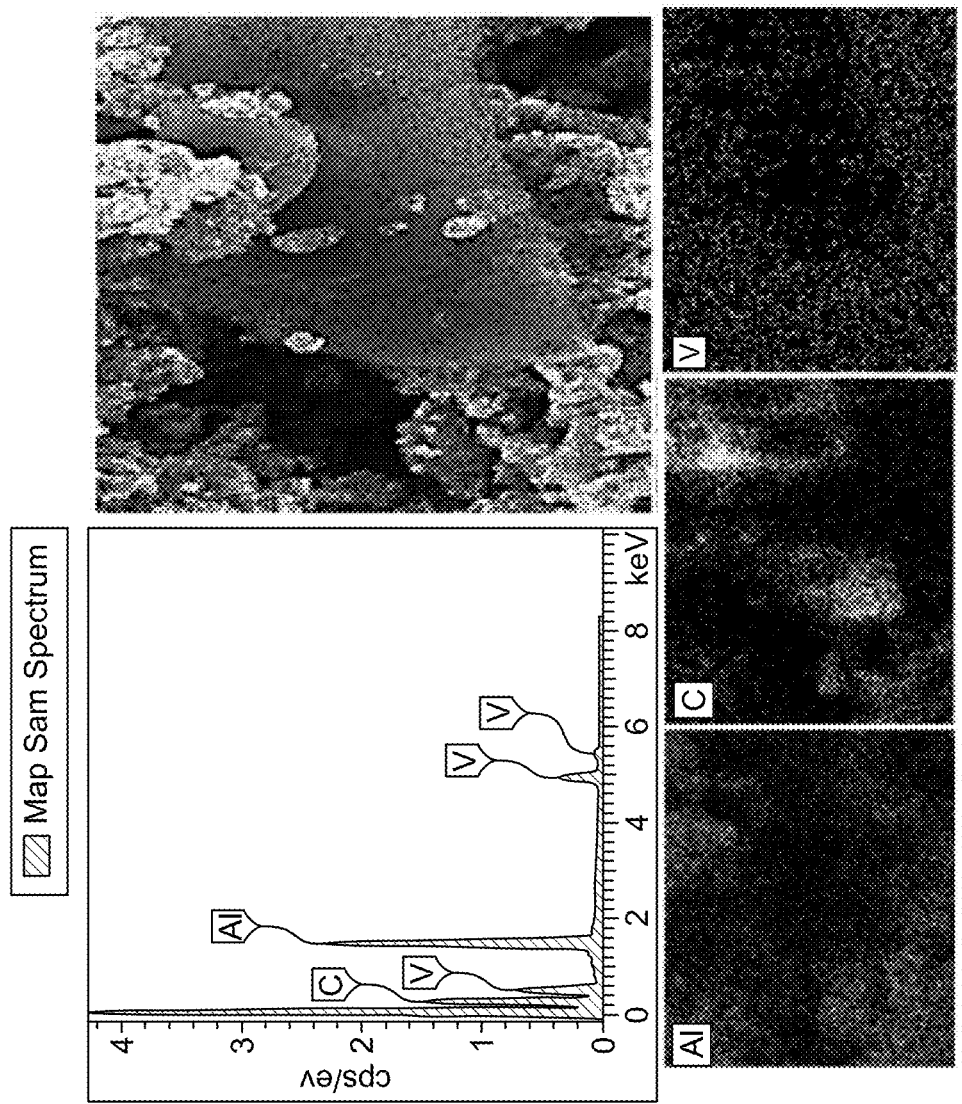
FIG. 8B illustrates an EDS and elemental mapping of the $V_2AlC$ MAX phase, according to certain embodiments.
Figure 9B:
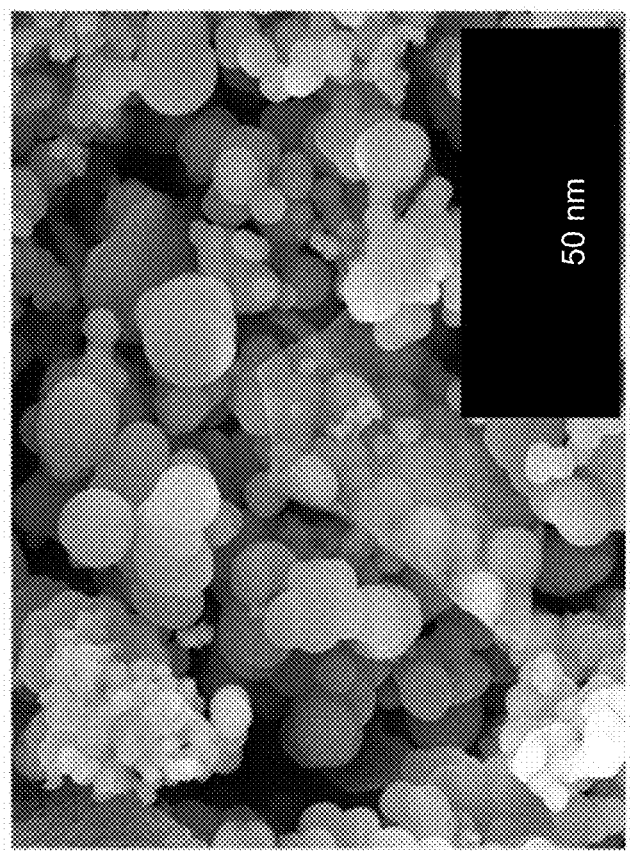
FIG. 9B illustrates a SEM image of AgNPs loaded on the $V_2CT_x$, according to certain embodiments.
Figure 9A:
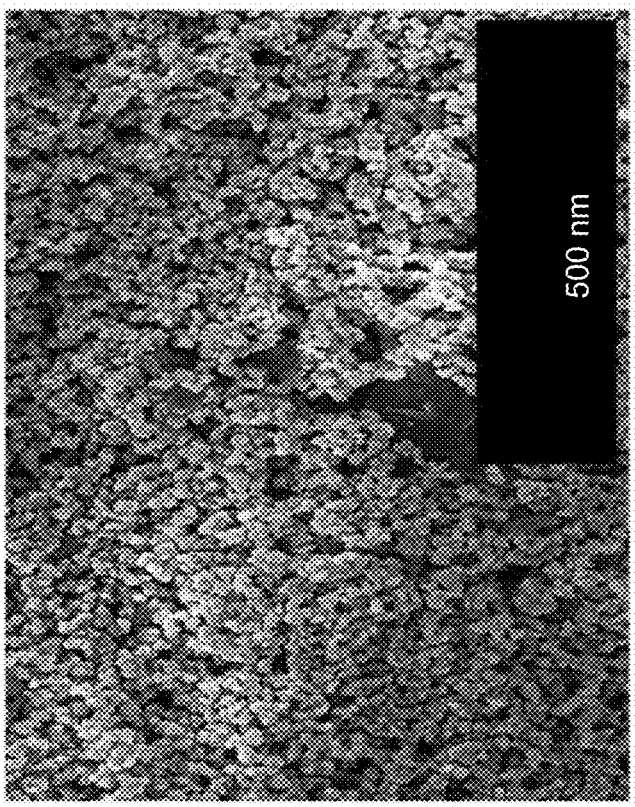
FIG. 9A illustrates a scanning electron microscope (SEM) image of the MXene-loaded silver nanoparticles (AgNPs) on the paper, according to certain embodiments.

FIGS. 7A-7D illustrates the morphology and chemical structure of the prepared $V_2CT_x$ further, the FE-SEM and TEM analyses were also carried out, and the results are presented in subsequent figures. The inset in FIG. 7A is the MXenes film coated on Whatman filter paper as a SERS substrate. The SEM images of the delaminated $V_2CT_x$ were collected at different resolutions and positions. While they depict stacked and delaminated $V_2CT_x$ flakes, the recorded morphogram showed a typical accordion-like and few-layered structure of $V_2CT_x$, thus validating the successful etching performed. FIGS. 8A-8B shows the chemical contents of the as-synthesized MXenes before and after etching were analyzed with energy dispersive spectroscopy (EDS). The spectra revealed the presence of vanadium and carbon along with traces of fluorine and oxygen as terminal groups, as compared to the precursor where the Al, along with V and C elements, are predominant, hinting to the successful etching of the MAX phase into MXenes. Additionally, the SEM image in FIG. 9A shows the self-assembled silver nanoparticle loaded on $V_2CT_x$. The round-shaped AgNPs were evenly distributed on the surface of the MXene with a particle size distribution of 10-50 nm, as presented in FIG. 9B. The size variation could be due to polydispersity and/or anisotropy. FIG. 4C shows that the microstructure and composition of the $V_2CT_x$ were further studied using the TEM technique. The 2D transparent stacked flakes could be observed with some V—C—V layers, while the high-resolution TEM image in FIG. 4D shows the lattice fringes with d-spacing of 1.13 nm and 1.07 nm, in agreement with the XRD findings.

Figure 10A:
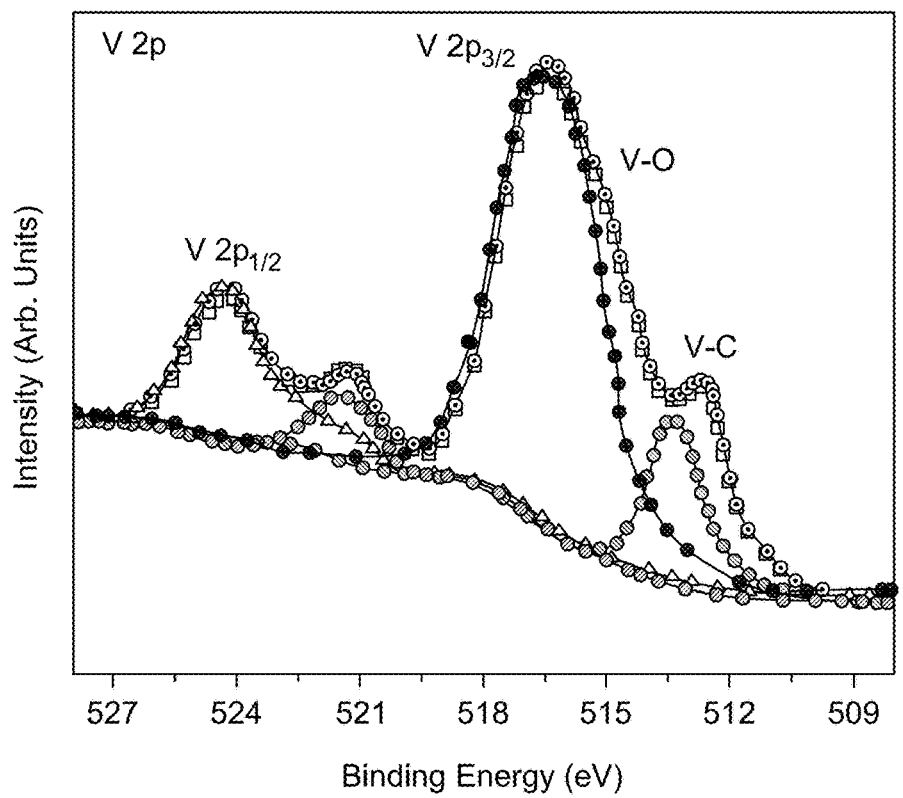
FIG. 10A illustrates an X-ray photoelectron spectroscopy (XPS) spectra depicting V 2p states of the $V_2CT_x$ MXenes, according to certain embodiments.
Figure 10B:
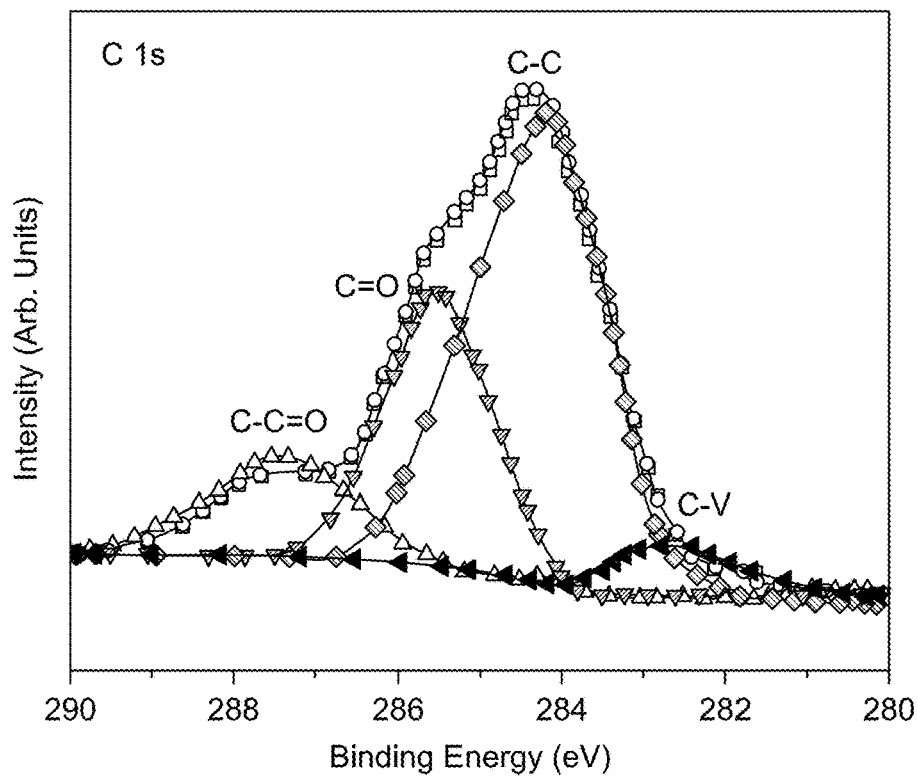
FIG. 10B illustrates an XPS spectrum depicting C 1s states of the $V_2CT_x$ MXenes, according to certain embodiments.
Figure 10C:
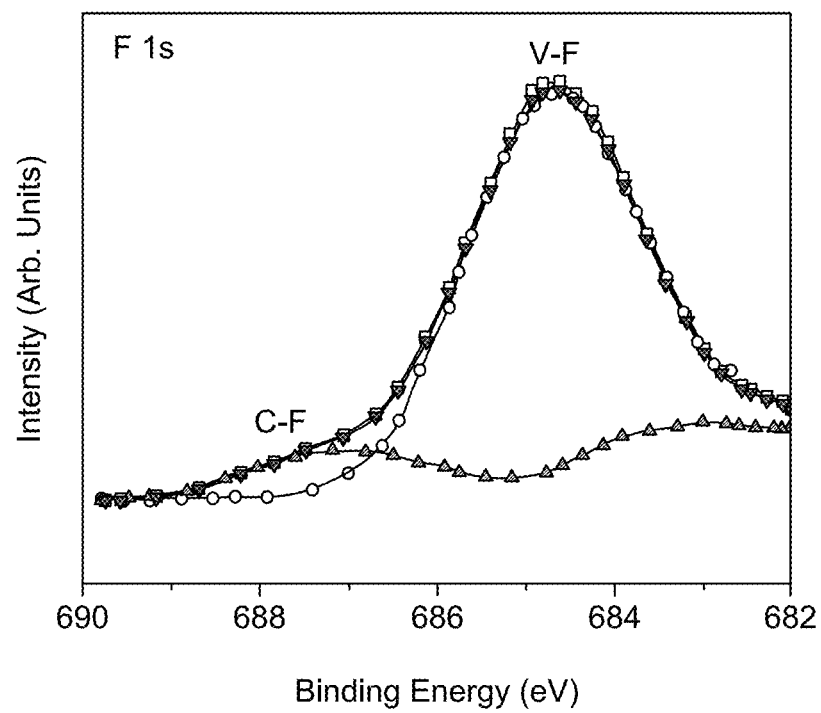
FIG. 10C illustrates an XPS spectra depicting F 1s state of the $V_2CT_x$ MXenes, according to certain embodiments.
Figure 10D:
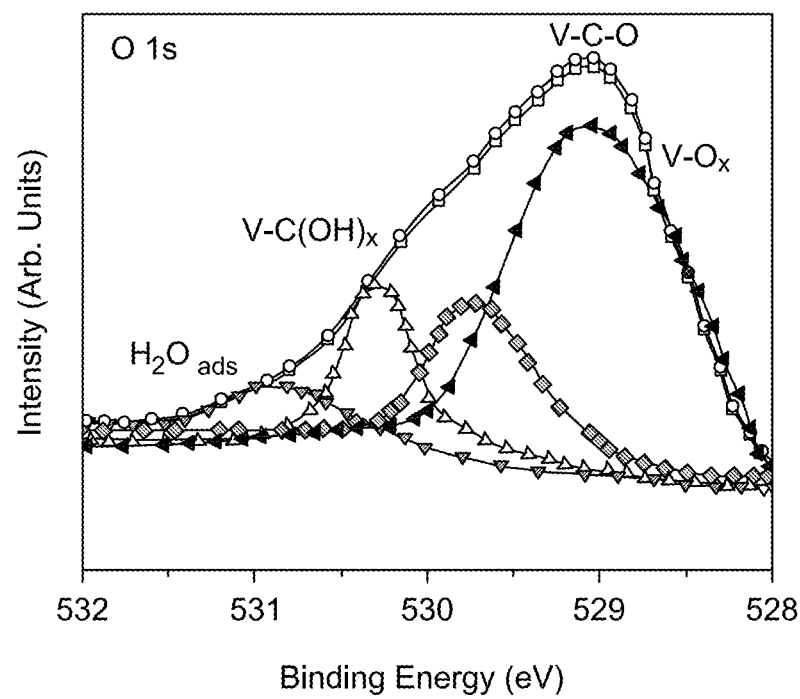
FIG. 10D illustrates an XPS spectra depicting O 1s state of the $V_2CT_x$ MXenes, according to certain embodiments.
Figure 11:
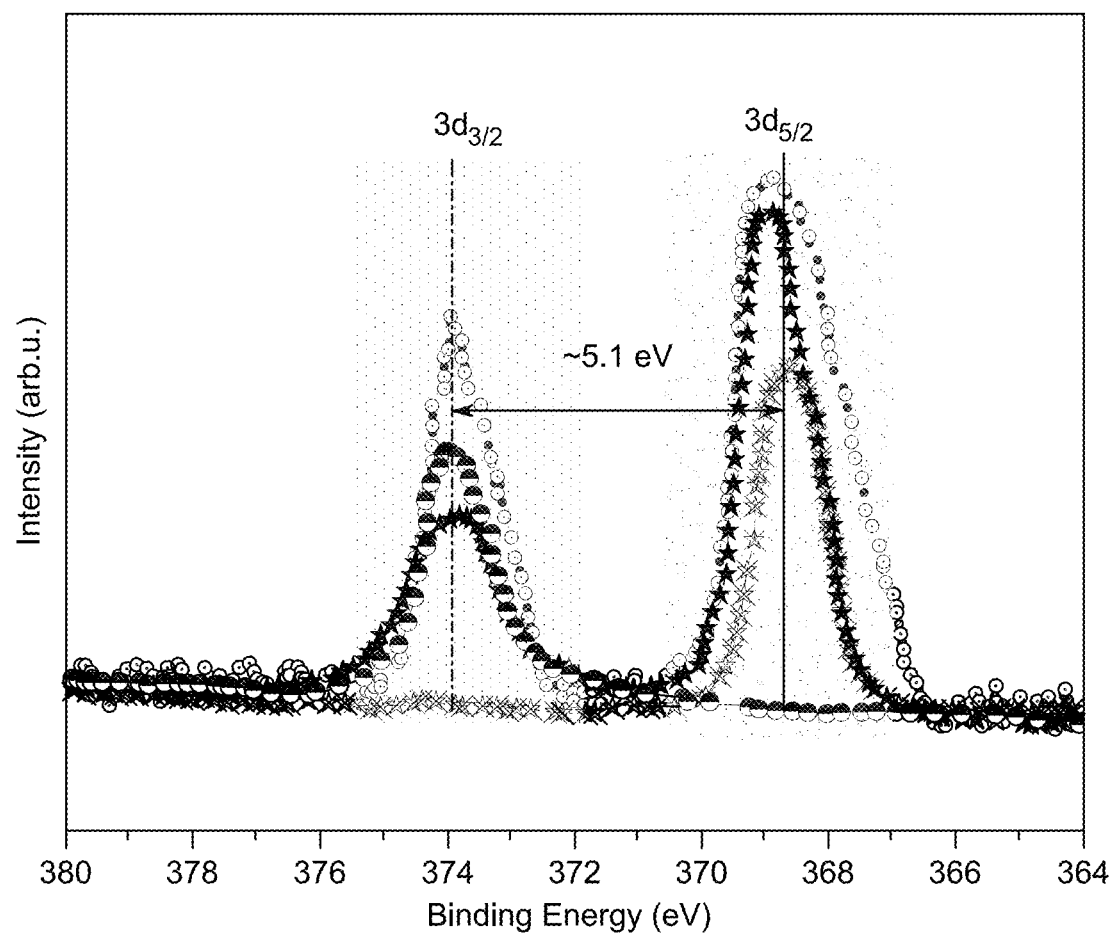
FIG. 11 illustrates the 3d core level spectrum of AgNPs@$V_2CT_x$ and shows the binding energy difference between two doublets $3d_{3/2}$ and $3d_{5/2}$ of Ag core, according to certain embodiments.

The elemental states, terminal group amounts, and chemical structure at the $V_2CT_x$ MXene surface were further explored using the X-ray photoelectron spectroscopy (XPS) method. FIG. 10A depicts the high-resolution V 2p spectrum fitted with two doubles. The peak at 513.29 electron volts (eV) was associated with the V—C bond, while the peak at 516.81 eV was assigned to the V—O bond. The vanadium is mainly in the $V^{+4}$ state due to the O-containing terminals. Likewise, the XPS spectrum is depicted in FIG. 10B corresponds to the C 1s state. The presence of C—C and C—O was mainly due to the impurities, while the V—C component corresponding to the $V_2C$ lattice is located at 283.36 eV. FIG. 10C shows the F 1s spectrum of the V—F peak at 684.91 eV terminal components and residual C—F bonds at 687.02 eV. FIG. 10D shows that the O 1s state analysis depicts the peaks of V—C—O, V—C—(OH)x, and V—O along with $H_2O$ components, in good agreement with the previously reported work. FIG. 11 shows the shift in binding energies interaction between AgNPs and $V_2CT_x$ hybrid SERS substrate. The two doublets' peaks of $3d_{3/2}$ (373.94 eV) and $3d_{5/2}$ (368.81 eV) were associated with a two spin-orbit pair. The lower binding energy component (368.81 eV) was a characteristic peak of electron emission from the silver nanocore. The difference in binding energies of the two doublets confirms the presence of self-assembled AgNPs on $V_2CT_x$ film.

Figure 12B:
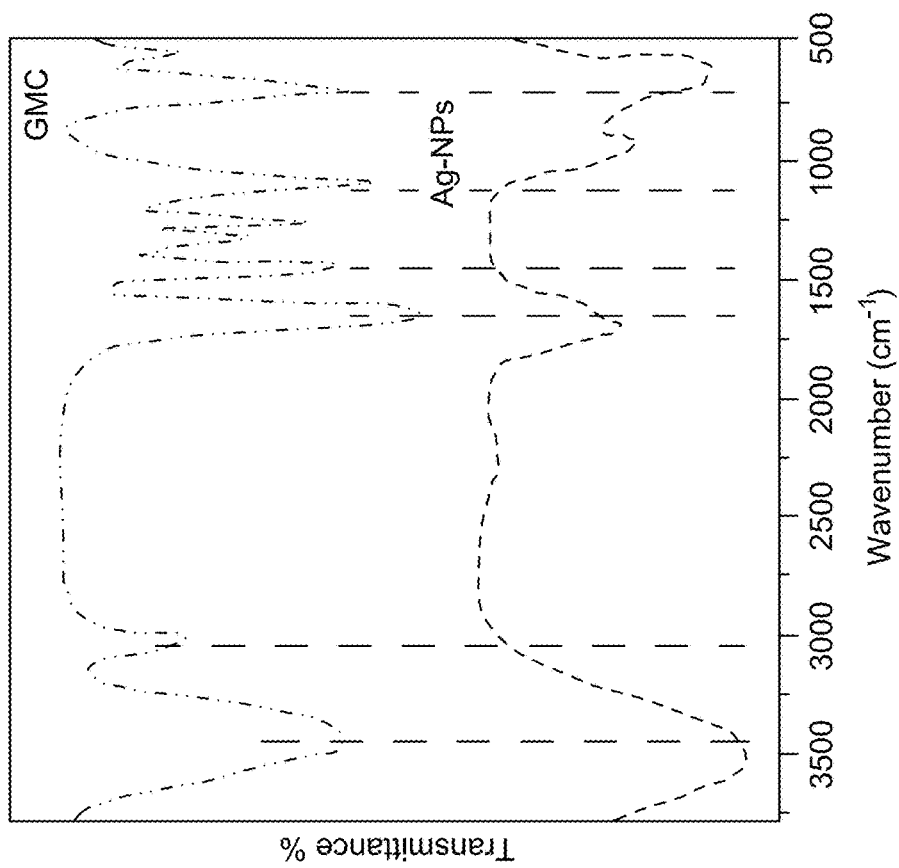
FIG. 12B illustrates an FTIR of pure GMC drug molecules and pure AgNPs, according to certain embodiments.
Figure 12A:
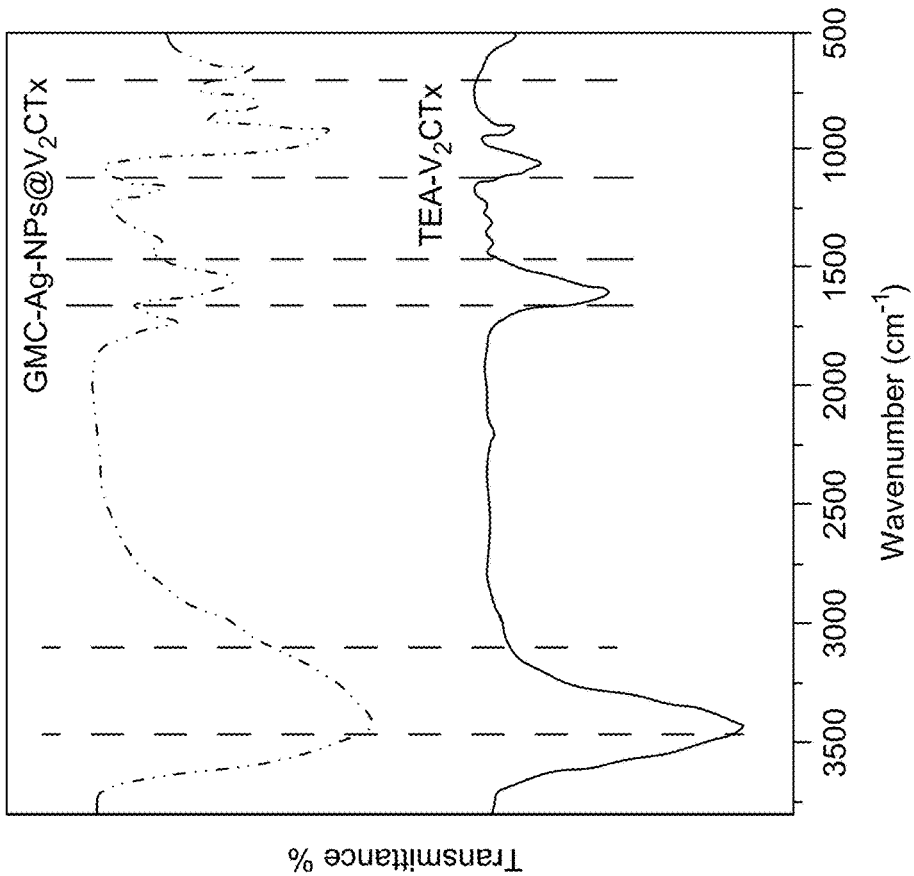
FIG. 12A illustrates a Fourier transform infrared (FTIR) of free $V_2CT_x$ and after loading the GMC at AgNPs@$V_2CT_x$ hybrid SERS substrate, according to certain embodiments.

Moreover, the surface state of the $V_2CT_x$ MXenes and the interaction with AgNPs and GMC were investigated by FT-IR spectroscopy, represented in FIG. 12A. The characteristic vibrational bands for the pure $V_2CT_x$ located at 3427, 1614, 1145, and 834 $cm^{-1}$ correspond to the O—H, C=O, C—OH, and in-plane motion of carbon atoms. Shifts in band position and drop in intensity were observed after the loading of silver nanoparticles and interaction with GMC. For instance, the vibrational wavenumbers shifted to 3409, 1562, 1184, and 820 $cm^{-1}$, besides a few new vibrational bands at 1729, 1164, and 636 $cm^{-1}$ that were observed in the case of GMC-AgNPs@$V_2CT_x$ as compared to non-interacted AgNPs, and GMC as shown in FIG. 12B. The observed variations in the infrared spectral intensities and band positions indicate that silver nanoparticles and GMC successfully load the $V_2CT_x$.

Example 8: MAX Phase Transformation into $V_2CT_x$ MXene

Figure 13A:
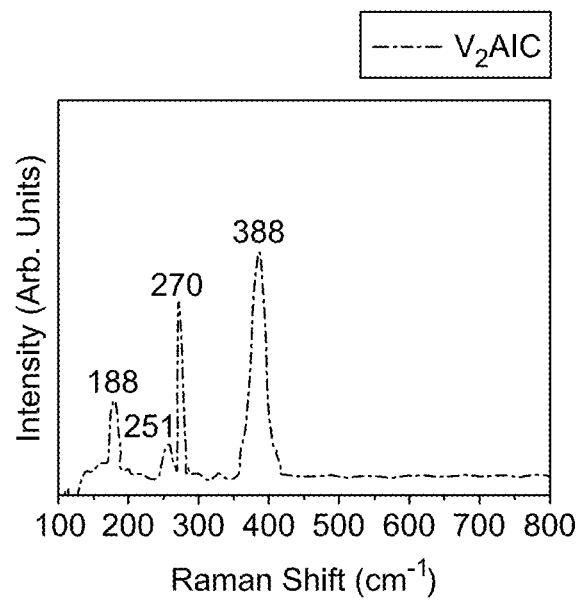
FIG. 13A illustrates a Raman spectrum of $V_2AlC$ MAX phase, according to certain embodiments.
Figure 13B:
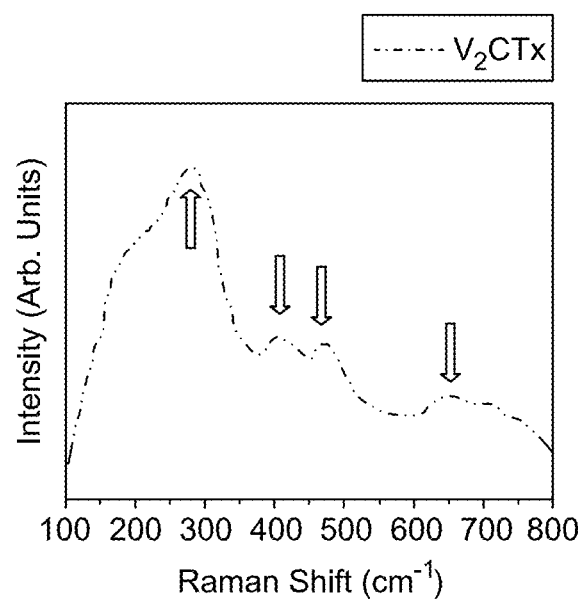
FIG. 13B illustrates a Raman spectrum of delaminated $V_2CT_x$, according to certain embodiments.
Figure 13C:
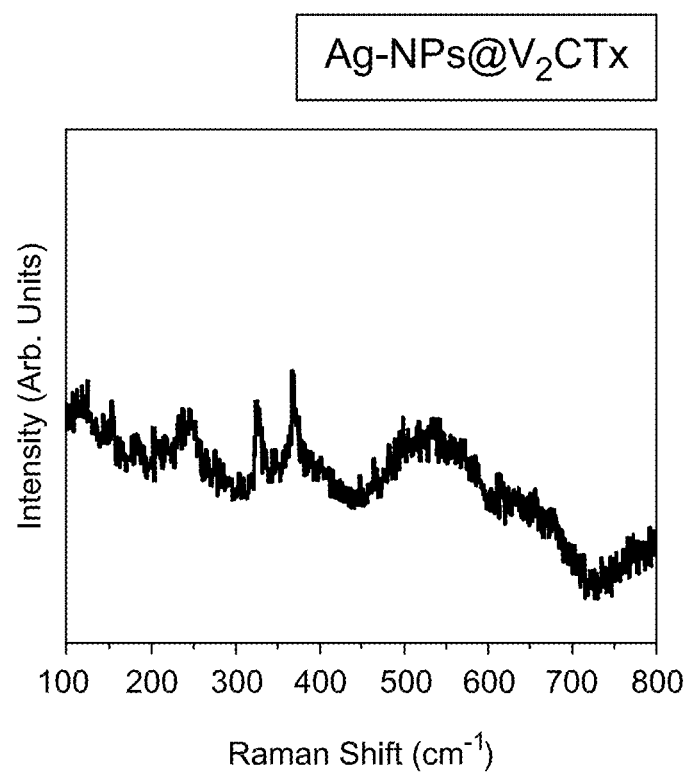
FIG. 13C illustrates a Raman spectrum of AgNPs loaded $V_2CT_x$ MXenes, according to certain embodiments.
Figure 14B:
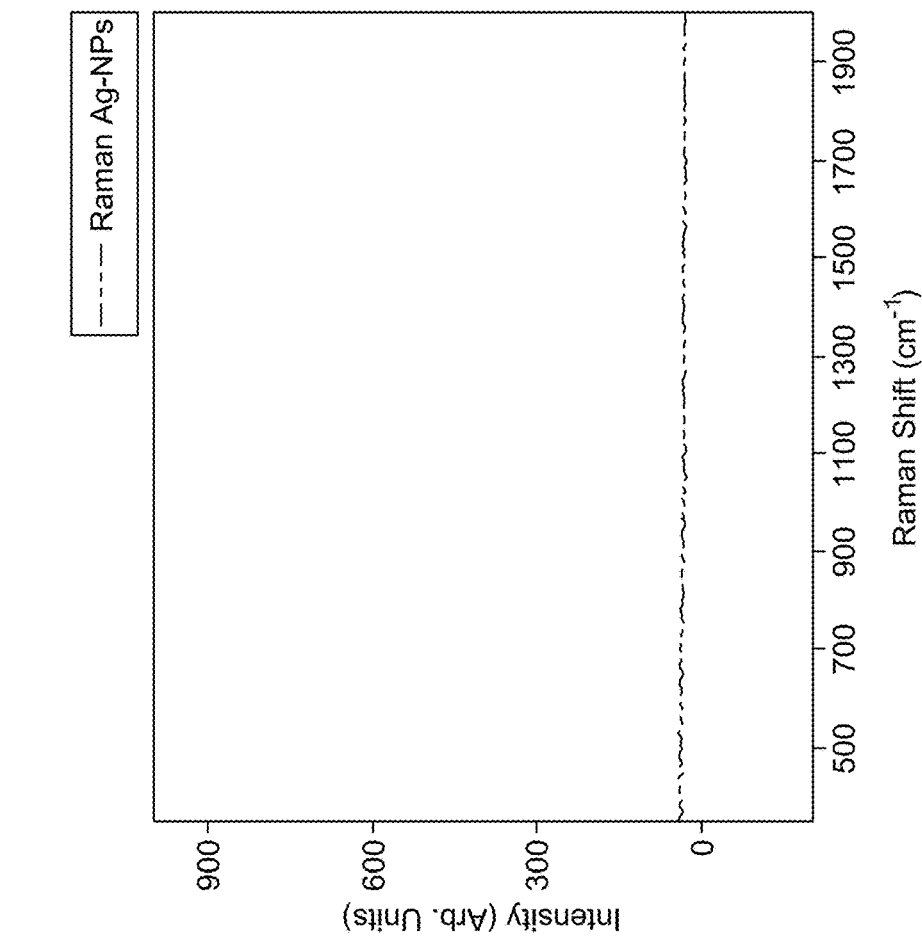
FIG. 14B illustrates a Raman spectrum of free Ag-NPs, according to certain embodiments.

FIGS. 13A-13C represents the transformation of the precursor $V_2AlC$ into the 2D $V_2CT_x$ phase, and the mobilization after-effect of the AgNPs with GMC adsorbates was assessed using Raman spectroscopy. FIG. 13A shows the Raman shifts of the $V_2AlC$ MAX phase showed four prominent peaks at 188, 251, 270, and 388 $cm^{-1}$ corresponding to $E_{2g}$, $E_{2g}$, $E_{1g}$, and $A_{1g}$ symmetry modes, respectively. The former two modes were associated with the in-plane vibration of Al and V atoms, while the latter two are ascribed to in-plane and out-of-plane vibrations of the vanadium atom. After treatment with a mixed acid etchant, FIG. 13B showed that the formed $V_2CT_x$ MXenes showed a reduction in peak intensities associated with the rise of a wide band above 400 $cm^{-1}$. Such a spectral change is explained based on the increased interlayer spacing in the delaminated MXene flakes compared to the 3D precursor. Since the etching involved replacing aluminum with other terminal groups, such as F, O, and —OH, it resulted in a broad Raman signature at 291, 415, and 477 $cm^{-1}$ and a hump at 650 $cm^{-1}$. These additional bands confirmed the successful and homogenous removal of Al. The hump appearing at 650 $cm^{-1}$ originated from heterogeneous terminals. The Raman spectrum of $V_2CT_x$ MXenes after loading with self-assembled nanoparticles is shown in FIG. 13C. Since AgNPs showed almost a blank Raman background in the 200-2000 $cm^{-1}$ region, as shown in FIG. 14B, they posed minimum interference with the Raman spectrum of $V_2CT_x$. Therefore, any Raman peak observed within this range is exclusively attributed to the as-prepared $V_2CT_x$ sheets. However, the Raman spectrum FIG. 13C depicts a shift and a rise of new lines at 253, 342, and 393 $cm^{-1}$ along with a wide band at 550 $cm^{-1}$ associated with a shoulder at 639 $cm^{-1}$ that may have resulted due to the in vitro interaction or photoinduced charge transfer of the AgNPs with the MXene heteroterminal groups. This might explain the self-assembled NPs observed to agglomerate on the MXene surface (FIG. 9B).

Example 9: Detection of GMC Using MXene-Based SERS Active Substrate

Figure 14A:
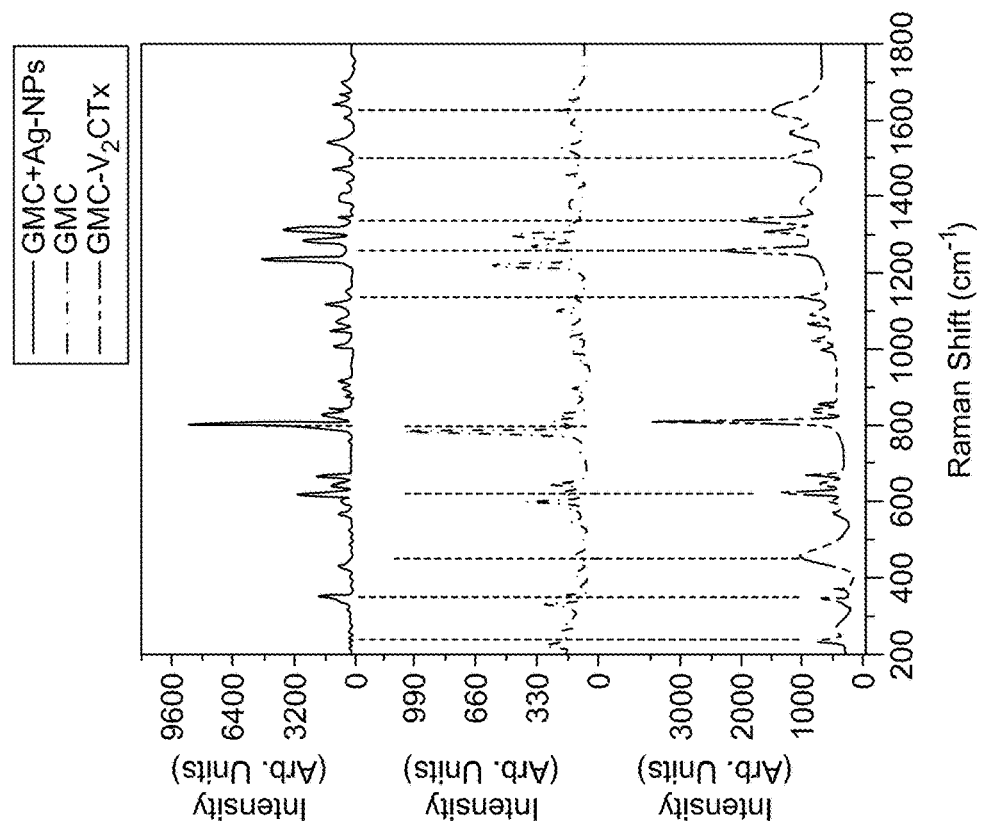
FIG. 14A illustrates a Raman spectrum of free GMC, GMC with AgNPs, and GMC with bare $V_2CT_x$ MXenes, according to certain embodiments.
Figure 15:
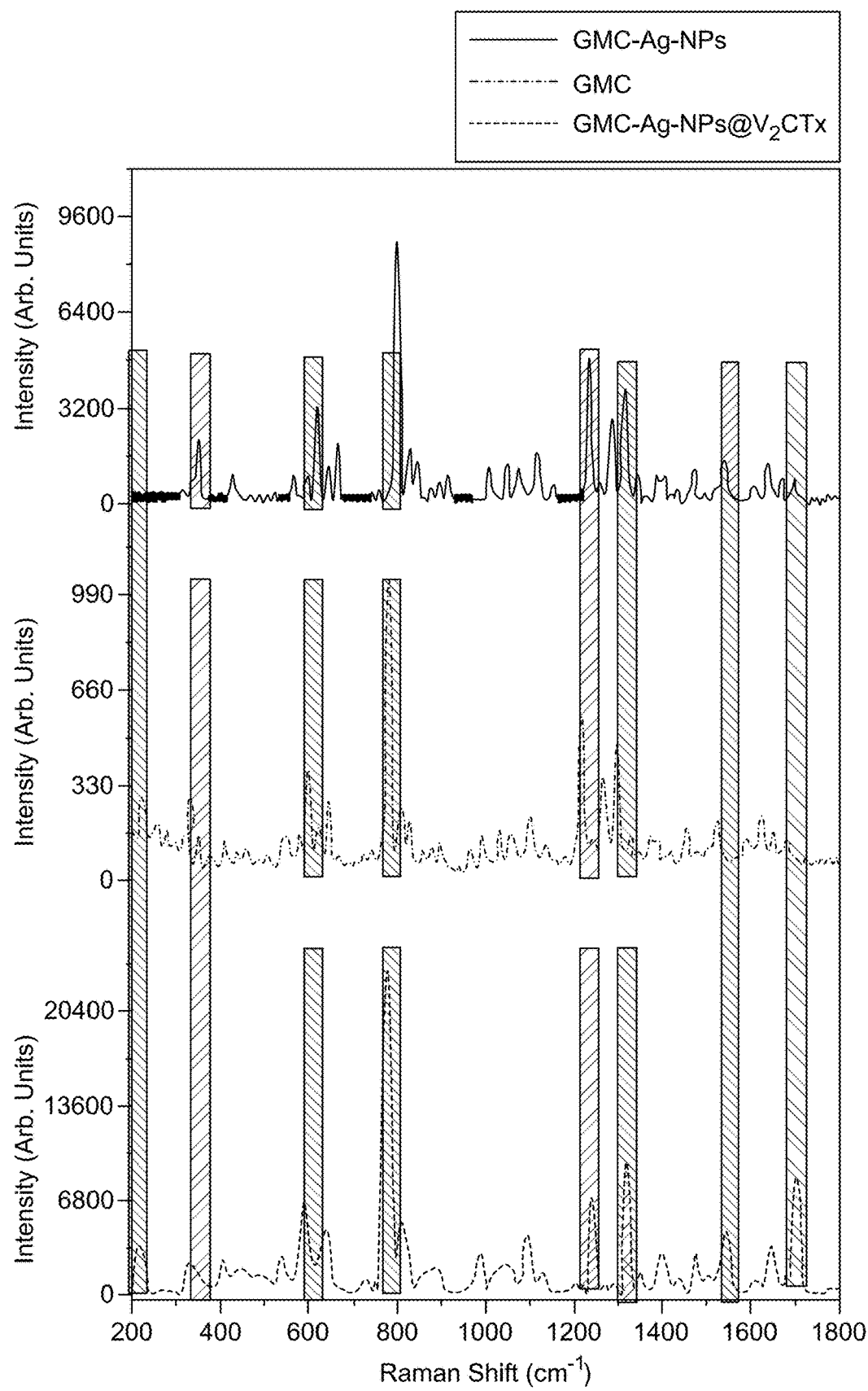
FIG. 15 illustrates a Raman spectrum of the free GMC, the GMC with AgNPs, and the GMC with AgNPs@$V_2CT_x$ recorded by the drop-casting of 50 microliters (μl) of $10^{-4}$ M GMC solution on a 20×20 millimeters (mm) area of hybrid AgNPs@$V_2CT_x$ substrate, according to certain embodiments.

FIG. 15 shows the SERS spectra of free GMC, loaded on AgNPs, and loaded on AgNPs@GMC hybrid substrate, indicating shifts in band position, i.e., the blue shift was observed in Raman lines at i) 781 (ring def. and OH bending) to 779 cm$^{-1}$, ii) 1098 (CH bend., C—F str.) to 1093 cm$^{-1}$, iii) 605 (C—F bend.) to 599 cm$^{-1}$, iv) 335 (Ring breathing.) to 322 cm$^{-1}$ v) 1651 (NH$_2$ bend.) to 1643 cm$^{-1}$. Likewise, red shifts were also noted for the Raman peaks, i.e., 1683 (C=O str.) to 702 cm$^{-1}$, 1503 (C=C str.) to 1526 cm$^{-1}$, 1285 (C—N bend.) to 1309 cm$^{-1}$, 1216 (CH$_2$ def.) to 1239 cm$^{-1}$ respectively. These shifts were observed along with a noticeable but variable increase in Raman intensities. The detailed assignments of the SERS peaks are provided in Table 1. Similarly, FIG. 14A depicts the comparison between the Raman spectrum of free GMC, the SERS spectrum when loaded with AgNPs, and the Raman spectrum of bare V$_2$CT$_x$ MXenes, for comparison. The spectra showed noteworthy shifts in peak position that is assumed to be due to the interaction of GMC molecules with MXenes. However, it could not show a significant enhancement in the Raman peaks compared to AgNPs@V$_2$CT$_x$ hybrid materials. The enhancement factor (EF) was calculated by using the formula: EF=(I$_{SERS}$/N$_{ads}$)/(I$_{bulk}$/N$_{bulk}$), where I$_{SERS}$ and Nans were the probe molecules under laser illumination area in both SERS and Raman experiments, and the I$_{bulk}$ and N$_{bulk}$ were intensities of characteristic Raman modes of the SERS and analyte accordingly. The SERS line centered at 779 cm$^{-1}$ in the spectrum of GMC adsorbed on the AgNPs@V$_2$CT$_x$ substrate, as shown in FIG. 15 was used to compute the enhancement factor, which turned out to be in the order of 109.

TABLE 1

Tentative assignments of the vibrational modes of GMC in the average Raman and SERS (before and after loading AgNPs on V$_2$CT$_x$) spectra

| Description | Raman | SERS AgNPs | AgNPs@V$_2$CT$_x$ |
|---|---|---|---|
| C=O str. | 1683 vw | 1689 vw | 1702 s |
| NH$_2$ bend | 1651 vw | 1655 w | 1643 w |
| C=C str. | 1503 w | 1516 w | 1526 w |
| CN bend. | 1279 m | 1292 m | 1309 s |
| CH$_2$ def. | 1216 s | 1234 s | 1239 w |
| CH bend, C—F str. | 1098 w | 1105 w | 1093 m |
| CH bend, CCN str. | 990 vw | 917 vw | — |
| Ring def., —OH bend | 781 vs | 806 vs | 779 vs |
| C—F bend | 605 m | 618 m | 599 w |
| Ring def., | 335 w | 325 w | 322 vw |
| Ring def. | 222 w | — | 219 vw |

The shifts in peak positions accompanied by enhancement observed in Raman intensities witnessed distinct interactions between GMC and AgNPs@V$_2$CT$_x$ hybrid material. The large specific surface area of the hybrid substrate and the strong plasmonic light field resonance-shaped surface turbulence by the mutual contribution of AgNPs and V$_2$CT$_x$ MXenes triggered such an enhancement. From the stacked plots shown in FIG. 15, the Raman peaks centered at 1702, 1309, 1239, and 779 cm$^{-1}$ have exercised maximum enhancements, confirming the interaction between AgNPs-V$_2$CT$_x$ and GMC was based on the CT and interband transition. It is worth mentioning here that the parental Raman bands of V$_2$CT$_x$, as shown in FIG. 14A has not been observed in the SERS spectra of GMC-AgNPs@V$_2$CT$_x$ film due to the AgNPs being effectively loaded across the hybrid substrate surface.

Figure 16A:
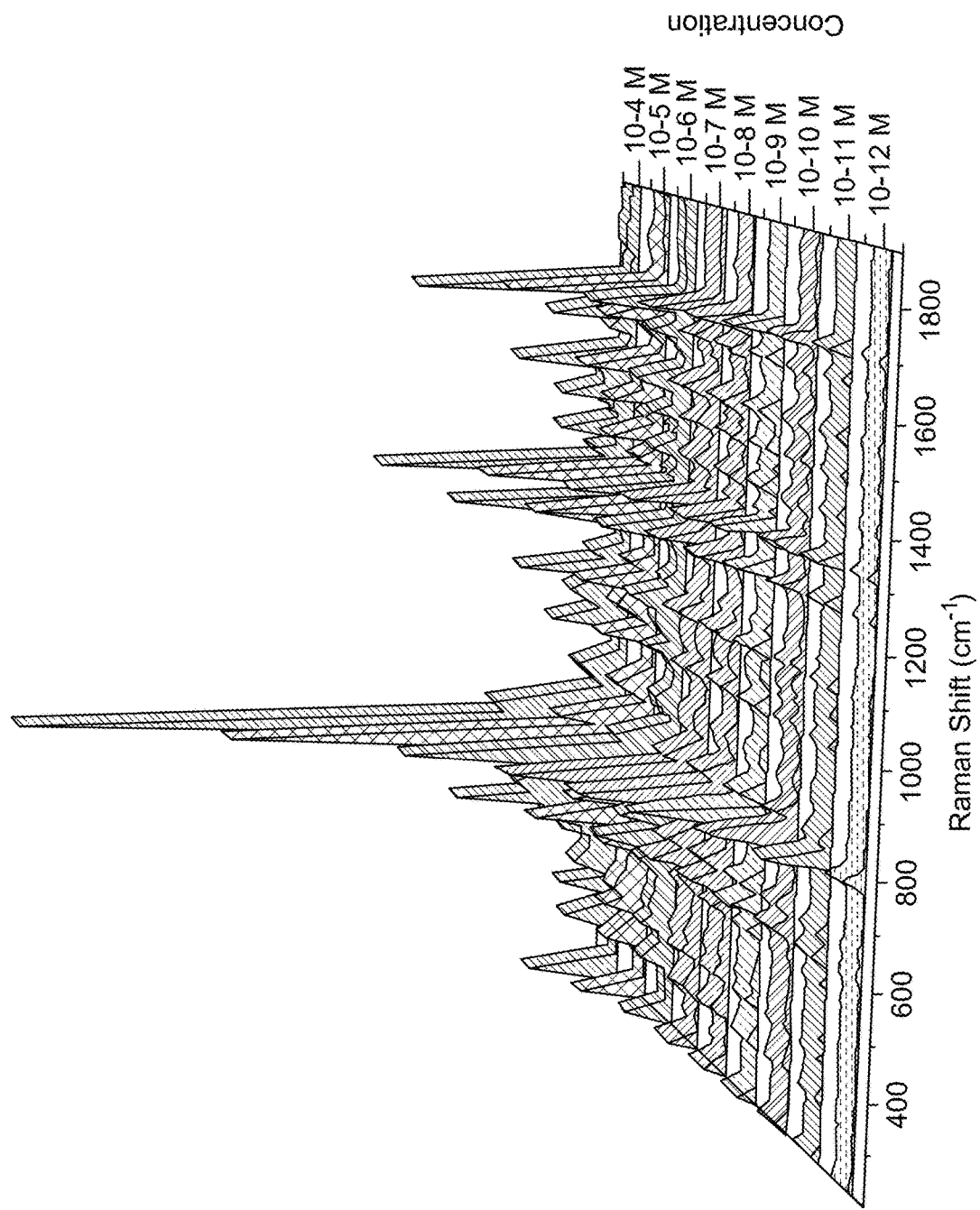
FIG. 16A illustrates SERS spectra of GMC at the concentration range $10^{-4}$-$10^{-12}$ Molarity (M) using the AgNPs@$V_2CT_x$ substrate, according to certain embodiments.
Figure 16B:
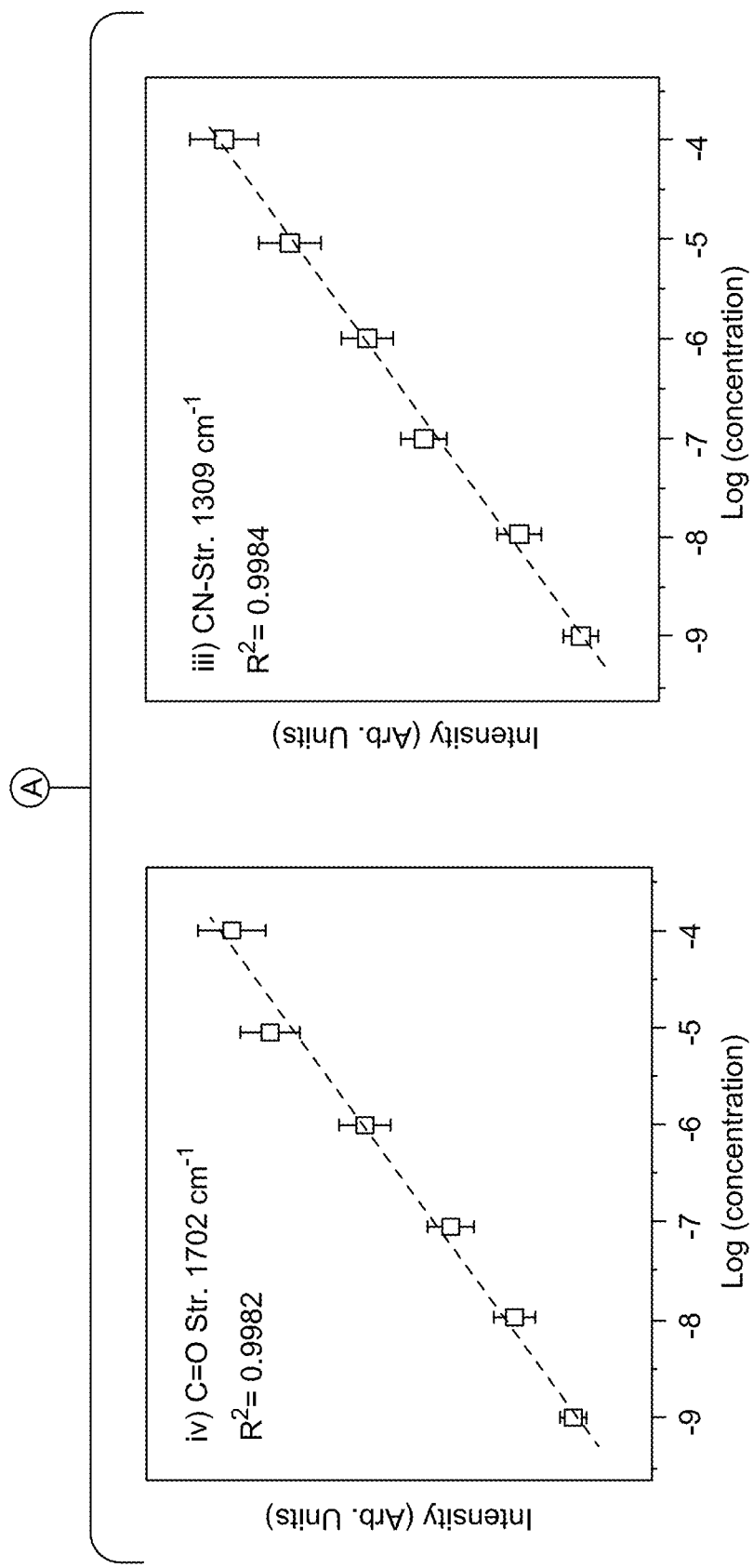
FIG. 16B illustrates a logarithmic relationship between prominent SERS peak intensities and concentrations of GMC molecules, according to certain embodiments.
Figure 16B:
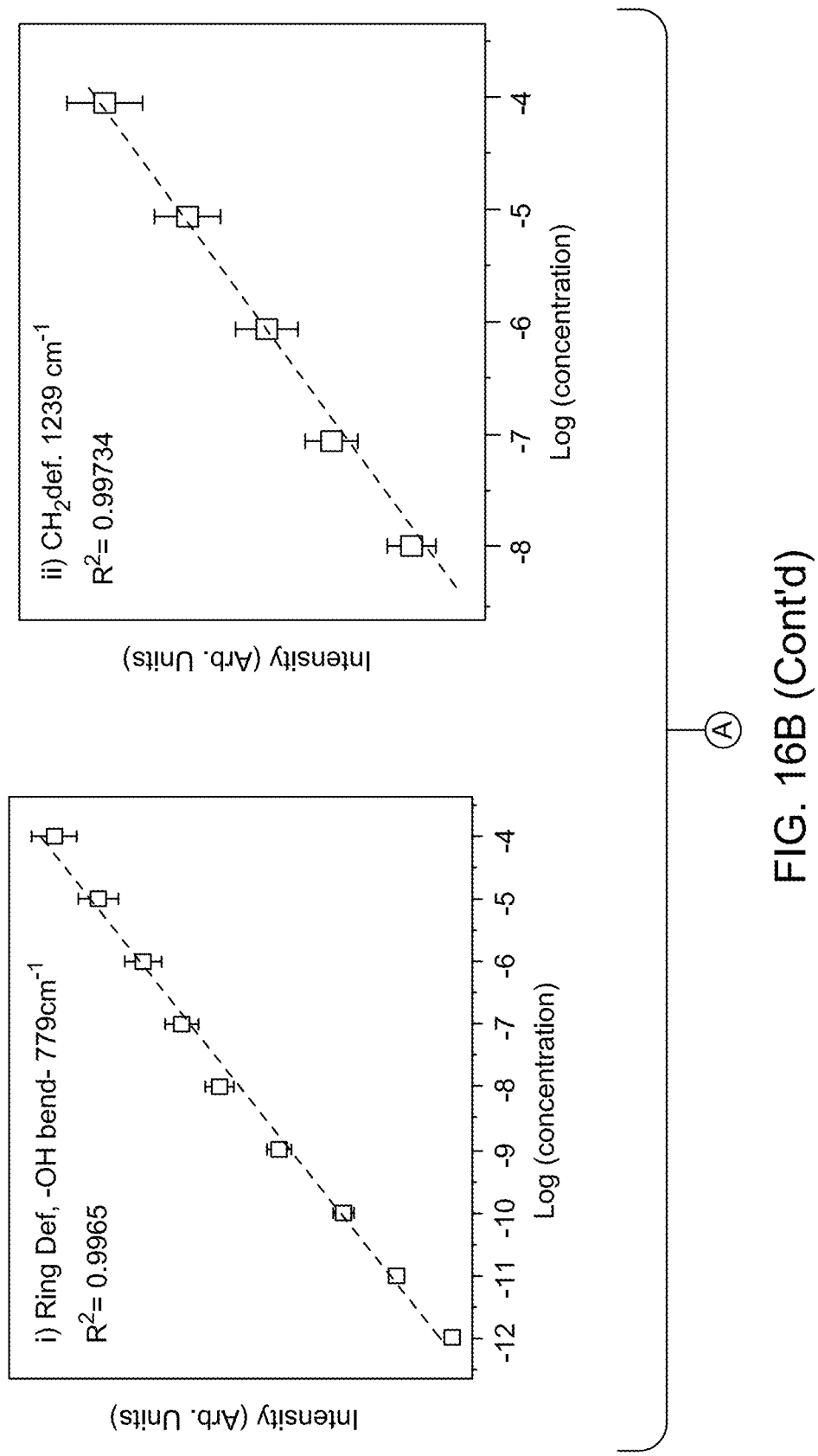

FIG. 16A shows that the limit of detection (LOD) of GMC was determined by measuring the SERS spectra at various drug concentrations in the range of 10$^{-4}$ to 10$^{-12}$ M. A uniform spectral pattern is observed with a decrease in peak intensity associated with a change in the concentration of the GMC. The intensities are likely linearly proportional to the logarithm of the concentration of the drug analyte. Thus, spectral intensity enchantment was indicative of the simultaneous interaction of GMC molecules with AgNPs@V$_2$CT$_x$ hybrid substrate at multiple spots, as shown in FIG. 16A. The LOD reached an order of 10$^{-12}$ M concentration by the method of the present disclosure. Further, as shown in FIG. 16B, it corresponded to a wide linear dynamic range (LDR) from 10$^{-4}$ to 10$^{-12}$ M. The SERS peak at 779 cm$^{-1}$ postured the widest LDR, possibly due to a robust interaction leading to an intense signal. In comparison, the other peaks (1239 cm$^{-1}$, 1309 cm$^{-1}$, and 1702 cm$^{-1}$) posed narrower LDRs, which is attributed to the molecular orientations impacting the extent of interaction and, hence, resulted in less intense signals. The intensity was described in a logarithmic relation to the concentration of the analyte; this portrayed a decrease in signal intensity linearly as concentration decreased. The observed enhancement was a two-logarithmic step more sensitive than the previous report that utilized only AgNPs. The linear regression coefficient (R$^2$) of the prominent Raman peaks at 779 cm$^{-1}$, 1239 cm$^{-1}$, 1309 cm$^{-1}$, and 1702 cm$^{-1}$ were calculated to be 0.9965, 0.99734, 0.9984, and 0.9982, respectively.

Example 10: Reproducibility and Stability of the Prepared Silver-Loaded MXene

Figure 17:
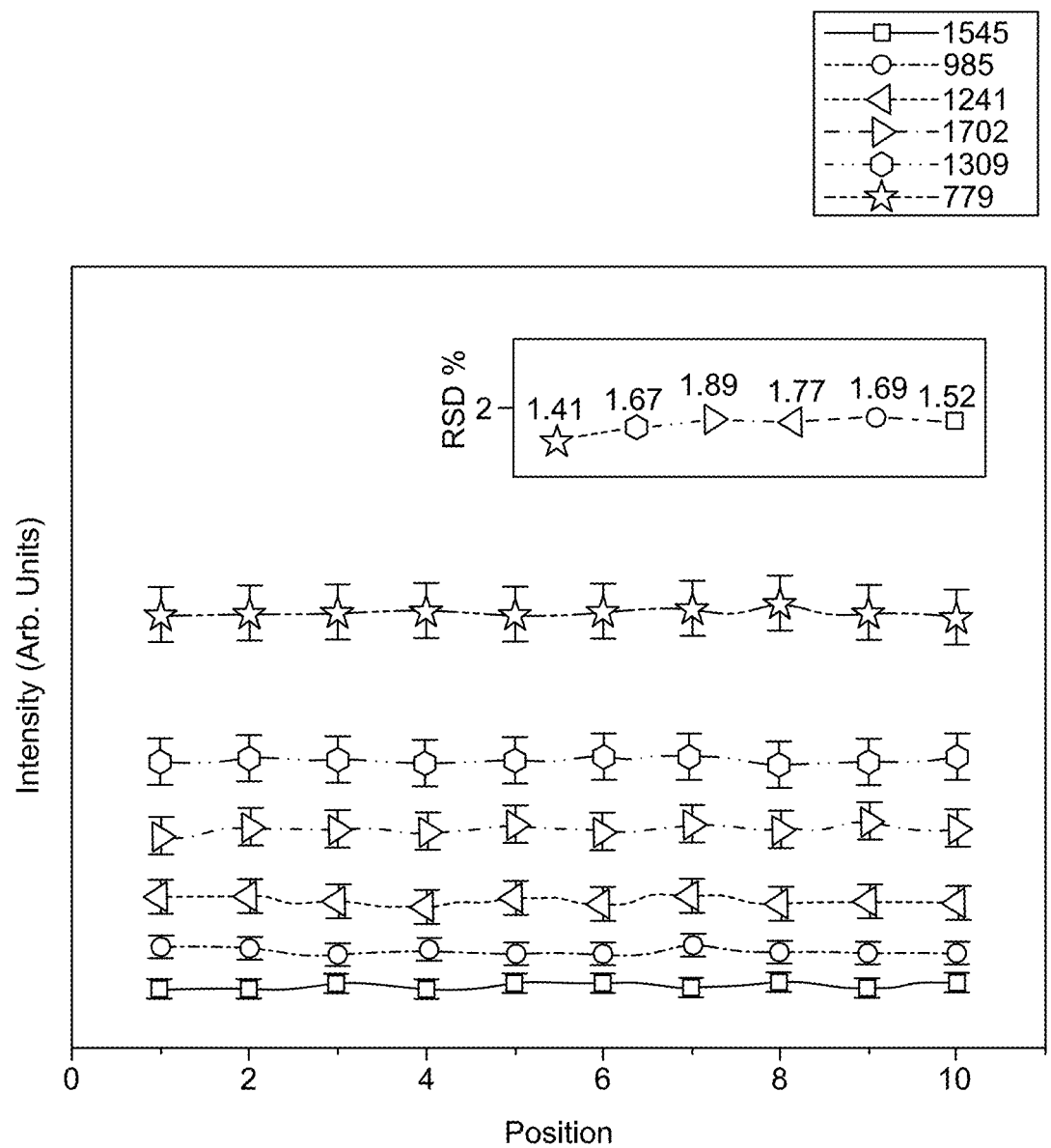
FIG. 17 illustrates the SERS spectra of the AgNPs@$V_2CT_x$ hybrid materials of different peak positions, according to certain embodiments.
Figure 18A:
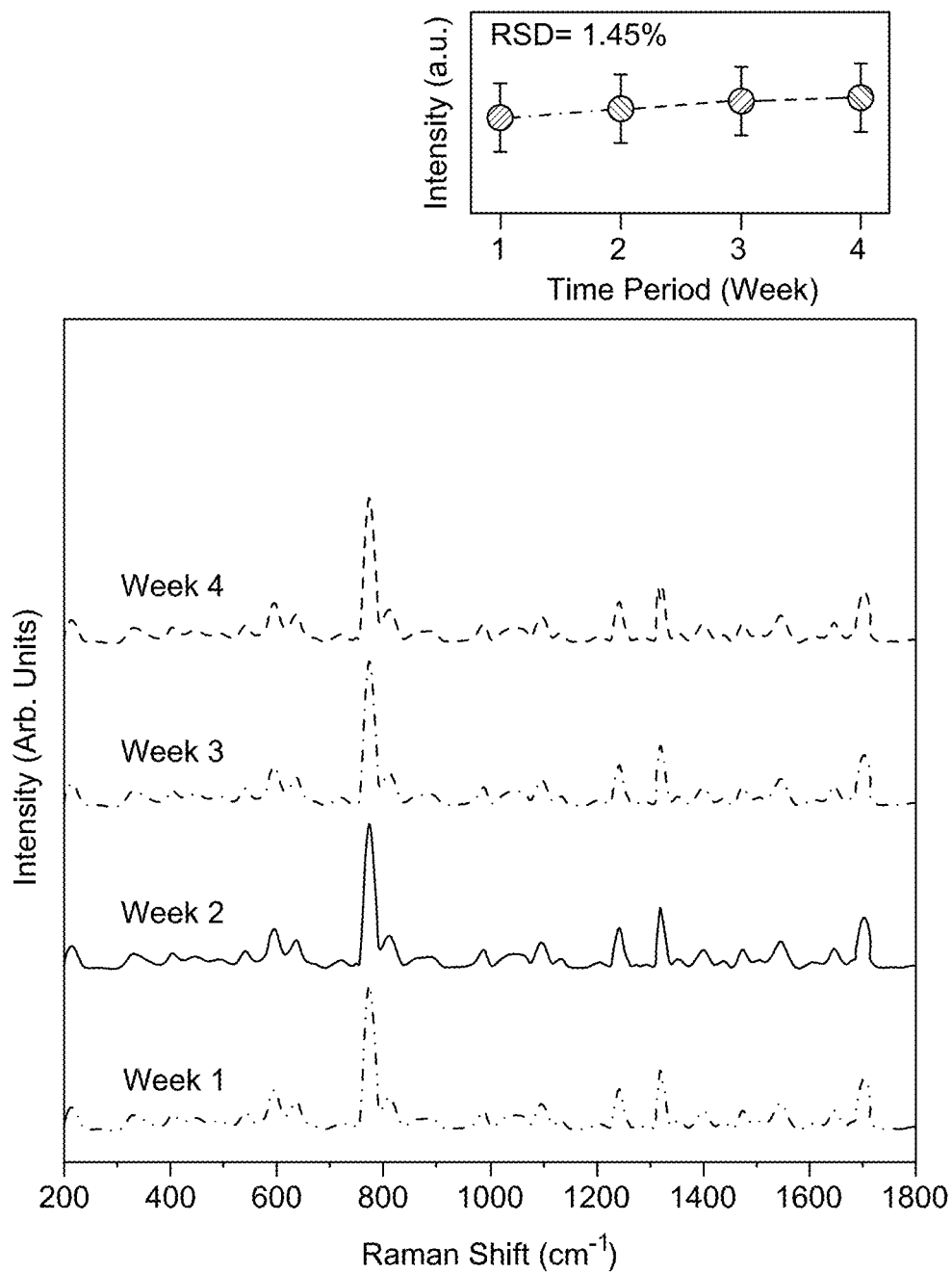
FIG. 18A illustrates SERS spectra of GMC using the AgNPs@MXene substrate taken over four weeks and shows the Raman intensity distribution of the line at 779 centimeter inverse ($cm^{-1}$), according to certain embodiments.
Figure 18B:
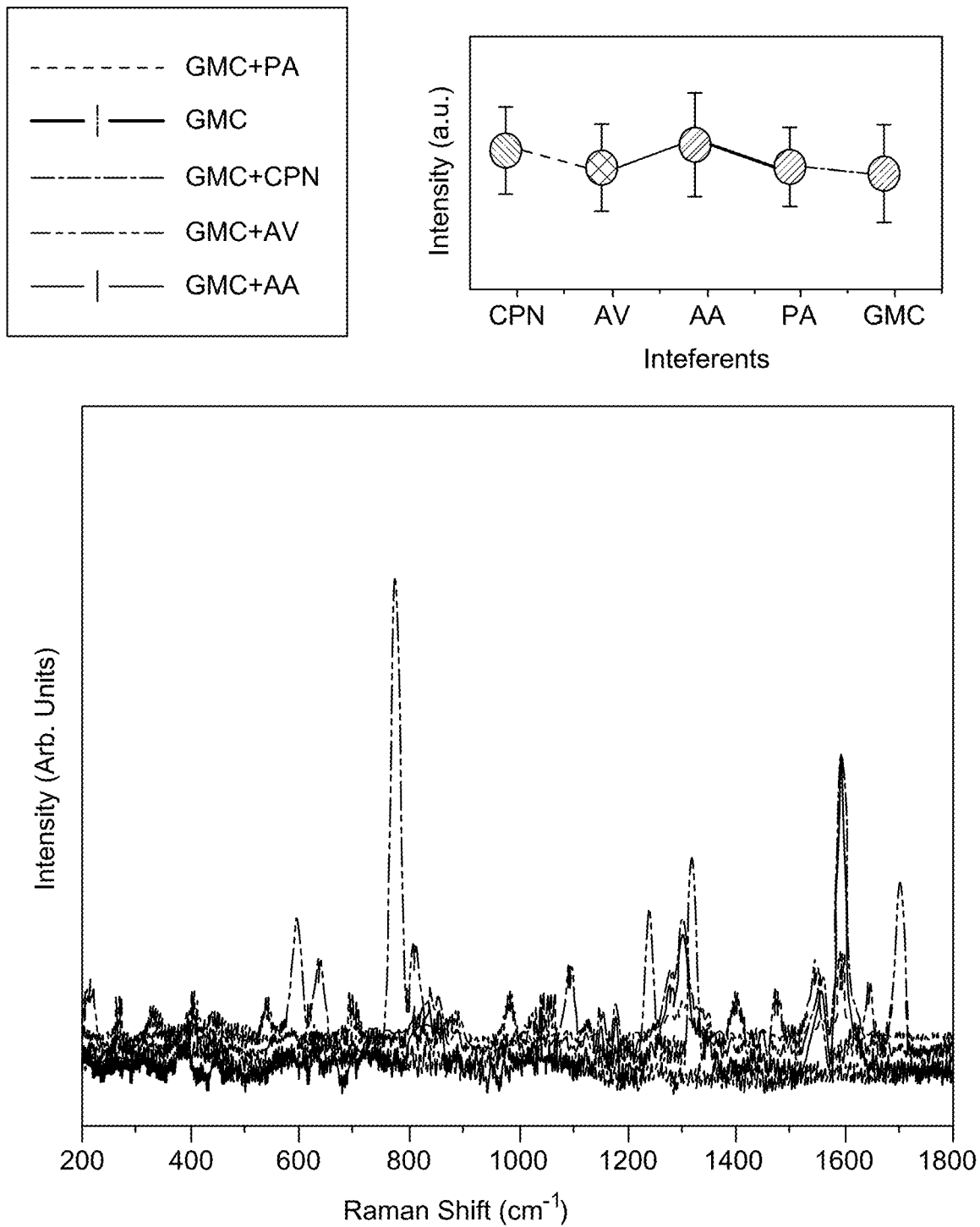
FIG. 18B illustrates an interference effect of different bioactive drugs and depicts the effect of interferent on the intensity of the Raman bands of the GMC, according to certain embodiments.

The reproducibility of the as-prepared silver-loaded V$_2$CT$_x$ MXene film was investigated with the 1×10$^{-5}$ M concentration of the GMC by selecting ten random spots in the film with an area of 25×25 μm at a gap of 2 m, as depicted in FIG. 17. The characteristic peak intensities for the representative peaks, i.e., 779 cm$^{-1}$, 1241 cm$^{-1}$, 1309 cm$^{-1}$, and 1702 cm$^{-1}$, were shown to be consistent and uniform. Moreover, the stability and liability of the as-prepared AgNPs-loaded MXene film were further verified by comparing the SERS spectra of the film with and without the loading of the drug molecules at different time intervals for an extended period of four weeks. The results are depicted in FIG. 18A showed a minimum change in peak intensities across the time interval of 4 weeks. For example, the Raman intensity distribution of the peak 779 cm$^{-1}$ over the examined period posed a consistency with an RSD of 1.89%, proving the repeatability of the developed approach. Likewise, to evaluate the selectivity of the developed approach, an interference study was carried out by mixing different interferents, namely procainamide (PA), ciprofloxacin (CPN), amphetamine (AA), and valeric acid (VA), of 1×10$^{-3}$ M concentration each with GMC that is kept at a concentration of 1×10$^{-5}$M. The SERS spectra of the interferents and analyte are shown in FIG. 18B highlights a negligible impact of interference by the other bioactive species, and the Raman intensities are 96% consistent with the originally observed ones. Furthermore, the RSD of the SERS peaks for the concentration (1×10$^{-5}$M) was noted to be 1.45%, while the average recovery was calculated to be 98%. These results confirmed that the prepared AgNPs@V$_2$CT$_x$ films are reliably used for the long term with excellent selectivity, linearity, efficiency, and reproducibility in GMC drug analysis.

Numerous modifications and variations of the present disclosure are possible in light of the above teachings. It is, therefore, understood that within the scope of the appended claims, the invention may be practiced otherwise than as specifically described herein.

The invention claimed is:

1. A method of detecting an anti-cancer drug in a solution, comprising:
    contacting a substrate with the solution; and
    measuring a Raman signal of the anti-cancer drug in the solution,
    wherein a layer of a nanomaterial is at least partially coated on an outer surface of the substrate,
    wherein the anti-cancer drug interacts with the nanomaterial on the outer surface of the substrate in the solution,
    wherein the nanomaterial comprises:
    silver nanoparticles; and
    a $V_2CT_x$ MXene,
    wherein $T_x$ is at least one selected from the group consisting of —OH, —O, and —F.

2. The method of claim 1, wherein the $V_2CT_x$ MXene comprises 40-60 wt. % V, 10-30 wt. % C, 5-25 wt. % O, and 0.1-2 wt. % F, and
    wherein the $V_2CT_x$ MXene does not comprise Al.

3. The method of claim 1, wherein the $V_2CT_x$ MXene is in the form of delaminated layered flakes.

4. The method of claim 3, wherein a spacing between layers of the flakes is 6-10 Å.

5. The method of claim 3, wherein the flakes have a longest dimension of 1-20 μm.

6. The method of claim 3, wherein the flakes have a thickness of 1-10 nm.

7. The method of claim 3, wherein an intercalant with a hydrated radii of 1-6 Å is intercalated between the layered flakes.

8. The method of claim 7, wherein the intercalant is triethylamine.

9. The method of claim 1, wherein the silver nanoparticles have an average diameter of 5-60 nm.

10. The method of claim 1, wherein the silver nanoparticles have a bimodal size distribution with a first set having an average diameter of 1-5 nm and a second set having an average diameter of 20-30 nm.

11. The method of claim 10, wherein the first set of silver nanoparticles are aggregated on the outer surface of the substrate and the aggregates have an average size of $10^{-30}$ nm.

12. The method of claim 1, wherein an outer surface of the silver nanoparticles have carboxylic acid groups.

13. The method of claim 1, wherein the silver nanoparticles are distributed on an outer surface of the $V_2CT_x$ MXene.

14. The method of claim 1, further comprising:
    quantifying the amount of anti-cancer drug in the solution based on the intensity of the Raman signal.

15. The method of claim 1, wherein an intensity of the Raman signal linearly correlates with an amount of the anti-cancer drug in the solution.

16. The method of claim 1, wherein an intensity of the Raman signal is $10^5$ to $10^9$ greater than a same solution but without contacting the substrate.

17. The method of claim 1, wherein the silver nanoparticles interact with the anti-cancer drug and the $V_2CT_x$ MXene via charge transfer interactions.

18. The method of claim 1, wherein a limit of detection of the anti-cancer drug in the solution is up to $1\times10^{-12}$ M.

19. The method of claim 1, wherein the anti-cancer drug is gemcitabine.

20. The method of claim 1, wherein the solution is human blood.

* * * * *